United States Patent [19]
Takeuchi et al.

[11] Patent Number: 5,944,930
[45] Date of Patent: Aug. 31, 1999

[54] METHOD OF MANUFACTURING TUBULAR FILM

[75] Inventors: Kazutaka Takeuchi; Shoichi Shimura, both of Yokohama, Japan

[73] Assignee: Canon Kabushiki Kaisha, Tokyo, Japan

[21] Appl. No.: 08/552,932

[22] Filed: Nov. 3, 1995

[30] Foreign Application Priority Data

Nov. 8, 1994 [JP] Japan ..................... 6-273615
Oct. 19, 1995 [JP] Japan ..................... 7-271079

[51] Int. Cl.⁶ ..................................... B32B 31/00
[52] U.S. Cl. ................. 156/218; 156/184; 156/308.2
[58] Field of Search ................. 156/272.2, 245, 156/304.1, 304.6, 184, 190, 191, 194, 500, 218, 137, 308.2, 309.6, 308.4; 264/512, 516, 299, 313, 320, 266, 267; 428/36.9, 36.91, 36.92; 271/34, 198

[56] References Cited

U.S. PATENT DOCUMENTS

| | | | |
|---|---|---|---|
| 3,993,522 | 11/1976 | Ballou | 156/137 |
| 4,082,521 | 4/1978 | McGarvey | 428/36.2 |
| 5,256,227 | 10/1993 | Roelofs | 156/304.6 |
| 5,560,883 | 10/1996 | Lane et al. | 264/266 |
| 5,720,834 | 2/1998 | Steele et al. | 156/272.2 |

FOREIGN PATENT DOCUMENTS

| | | |
|---|---|---|
| 55-57429 | 4/1980 | Japan . |
| 55-35247 | 9/1980 | Japan . |
| 63-34120 | 2/1988 | Japan . |
| 63-34121 | 2/1988 | Japan . |
| 63-313182 | 12/1988 | Japan . |

*Primary Examiner*—Jeff H. Aftergut
*Attorney, Agent, or Firm*—Fitzpatrick, Cella, Harper & Scinto

[57] ABSTRACT

A tubular film having a high film thickness uniformity and suitable for a fixing film of an image forming apparatus is provided. To achieve such a film, a thermoplastic sheet film is so wound that the leading and trailing end portions of the film partially overlap each other to form overlapping portions, and the wound film is heated between a core member and a tubular molding member.

21 Claims, 30 Drawing Sheets

FIG. 29

| No | COLUMNAR MEMBER | THERMAL EXPANSION COEFFICIENT (/°C) | TUBULAR MOLDING MEMBER | THERMAL EXPANSION COEFFICIENT (/°C) |
|---|---|---|---|---|
| 1 | Aℓ | $2.4 \times 10^{-5}$ | STAINLESS STEEL | $1.5 \times 10^{-5}$ |
| 2 | Aℓ | $2.4 \times 10^{-5}$ | GLASS | $5.5 \times 10^{-7}$ (QUARTZ) $9.9 \times 10^{-6}$ (SHEET GLASS) |
| 3 | PTFE | $10.0 \times 10^{-5}$ | STAINLESS STEEL | $1.5 \times 10^{-5}$ |
| 4 | PTFE | $10.0 \times 10^{-5}$ | Aℓ | $2.4 \times 10^{-5}$ |
| 5 | PTFE | $10.0 \times 10^{-5}$ | GLASS | $5.5 \times 10^{-7} \sim 9.9 \times 10^{-6}$ |

F I G. 41

| MEASURED SAMPLE | TENSILE STRENGTH ( Kg / cm² ) |
|---|---|
| TENSILE STRENGTH OF CONNECTED PORTION IN ELEVENTH EMBODIMENT | 700 ~ 780 |
| TENSILE STRENGTH OF CONNECTED PORTION IN TWELFTH EMBODIMENT | 930 ~ 990 |
| TENSILE STRENGTH OF PEEK FILM ( WITH NO CONNECTED PORTION ) | 990 ~ 1000 |

( TEST METHOD : ASTM ; D638, 23°C )

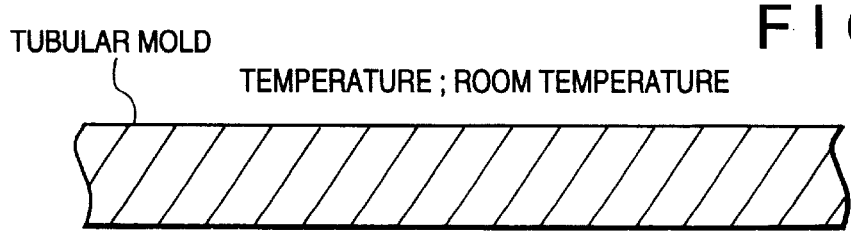
FIG. 45
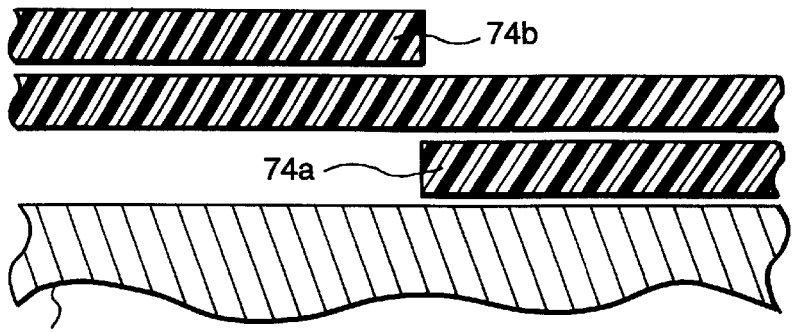
FIG. 46
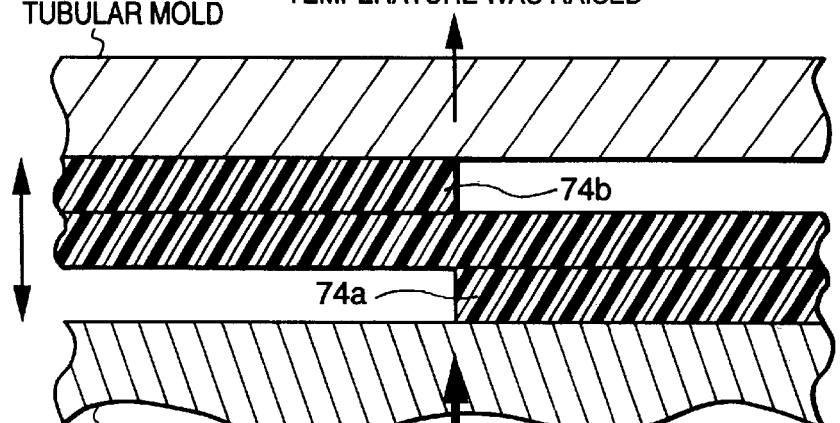
FIG. 47
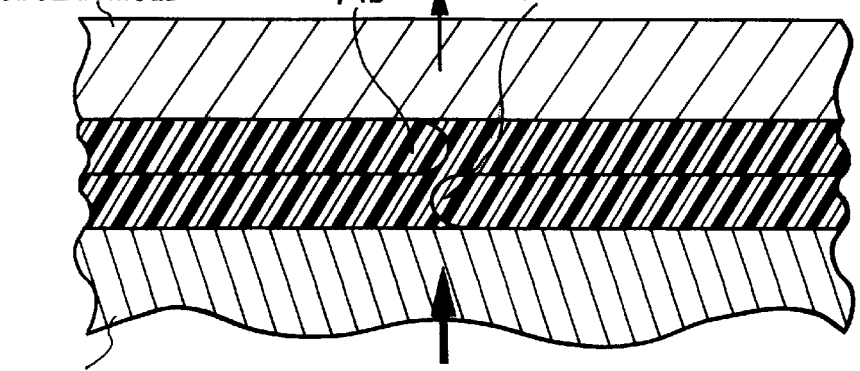

PORTION F

METHOD OF MANUFACTURING TUBULAR FILM

BACKGROUND OF THE INVENTION

The present invention relates to annular, tubular, cylindrical, ring-like, and belt-like films to be used as conveyor belts for conveying precision parts to a predetermined position with a high positional accuracy, or as sealing packages for packaging or containing products, and a method of manufacturing these films. The principal field of applications of the present invention is a functional part of an image forming apparatus.

The present invention particularly relates to a conveyor or image fixing film or belt for a toner carrier.

Conventional tubular film manufacturing methods are:
1) Extrusion hot-melt molding represented by blown-film extrusion; and
2) Casting in which a resin or a precursor of the resin is melted, a predetermined amount of the molten resin or precursor is coated on the inner and outer surfaces of a tubular mold, and the product is released after desolvation.

Also,
3) Japanese Patent Laid-open Nos. 63-34120 and 63-34121 have proposed methods by which a sheet film is wound on a core and the inner surface of a hollow tubular body is lined with the sheet by fusing the two ends of the sheet, and
4) Japanese Patent Publication No. 55-35247 has disclosed a method of manufacturing a polytetrafluoroethylene tubular body.

In conventional hot-melt molding process 1), if a tubular film formed by blown-film extrusion is used as a film for a fixing device of an image forming apparatus, FIG. 24, the tubular film is undesirably crushed when taken up.

In casting process 2), to obtain a uniform-thickness film there are problems of the concentration control of a solution, adjustment of the drying atmosphere, and the solvent treatment cost in the drying step.

In method 3) of lining the inner surface of a hollow tubular body, a lining layer with a uniform thickness can be obtained. However, when the lining layer is released from the inner surface of the hollow tubular body in order to obtain a tubular film, the lining layer is difficult to release because the adhesion with the hollow tubular body inner surface is strong.

SUMMARY OF THE INVENTION

It is an object of the present invention to provide a tubular film which solves the drawbacks of the above conventional tubular films, a method and an apparatus for manufacturing the tubular film, and a fixing device or a conveyor unit using the film. More specifically, the present invention proposes a film-like conveyor member suited to convey an information recording medium, such as a paper material, which carries image forming toner, under heated and pressurized conditions.

In the present invention, the term "tubular" of a tubular film used in the following description includes loop-like, tube-like, annular, ring-like, cylindrical, and hollow films formed by connecting the end portions of a flat sheet film.

Also, conveyor belts of belt conveyors, for example, are made of rubber materials or steel and hence have a thickness of about 1 mm. In the present invention, however, the term "film" indicates films having a thickness smaller than 1 mm because the invention is applied to films having this thickness.

It is the first object of the present invention to obtain a closed-loop tubular film, with a low cost and a high accuracy, for use in a fixing device or a transfer device for fixing or transferring images by conveying an image carrier, such as a sheet of paper, which carries images in an image forming apparatus.

In connection with the first object, it is another object of the present invention to obtain a tubular film with a highly uniform film thickness.

It is the second object of the present invention to provide a method of manufacturing a low-cost, high-accuracy tubular film with a high productivity.

It is the third object of the present invention to obtain a tubular film having a desired film thickness by setting an arbitrary film thickness.

It is the fourth object of the present invention to obtain a tubular film with a highly uniform film thickness, i.e., a tubular film in which the thickness variation in the circumferential direction is decreased to ±6% or less throughout the entire circumference.

It is still another object of the present invention to provide a fixing device free of a problem such as offset during fixing of toner of an image forming apparatus by using the tubular film which achieves the above objects, and an image forming apparatus capable of obtaining high-definition images by using the fixing device.

It is still another object of the present invention to provide a belt of a conveyor means.

To solve the above problems and achieve the objects, according to the first aspect a tubular film of the present invention has the following arrangement.

That is, a tubular film is characterized in that a thermoplastic sheet film is wound so that leading and trailing ends of the sheet film partially overlap each other to form overlapping portions, and the overlapping portions are connected by heating the wound sheet film for a predetermined time.

According to the second aspect a tubular film of the present invention has the following arrangement.

That is, a tubular film is characterized in that a first thermoplastic sheet film is wound so that leading and trailing ends form overlapping portions, and a second thermoplastic sheet film is wound on the first sheet film so that leading and trailing ends form overlapping portions, thereby forming a tubular body from the first and second sheet films, and the overlapping portions of the first and second sheet films are connected by heating the tubular body.

According to the third aspect a tubular film of the present invention has the following arrangement.

That is, a tubular film is characterized in that a thermoplastic sheet film is wound to form a wound body so that leading and trailing ends of the film overlap each other, and the wound body is covered with a thermoplastic tube and heated, thereby connecting the overlapping portions of the leading and trailing ends and forming a tubular body.

According to the fourth aspect a tubular film of the present invention has the following arrangement.

That is, a tubular film is characterized in that a thermoplastic sheet film is wound on a non-thermoplastic tube, leading and trailing ends of the film are partially overlayed on each other to form a multilayered tubular body, and the tubular body is heated to connect the overlapping portions.

According to the fifth aspect a tubular film of the present invention has the following arrangement.

That is, a tubular film is characterized in that a thermoplastic sheet film is wound on a columnar member, leading and trailing ends of the film are butted against each other, a tubular molding member is fitted on the wound film, and the butted portions of the film are connected by heating at least the film, thereby forming the sheet film into a tubular film.

According to the first aspect a tubular film manufacturing method of the present invention has the following arrangement.

That is, a method of manufacturing a tubular film comprises the steps of winding a thermoplastic sheet film on a columnar member, overlaying leading and trailing ends of the film on each other, and fitting a tubular molding member on the wound film, and connecting the overlapping portions of the film by heating at least the film, thereby forming the sheet film into a tubular film.

According to the second aspect a tubular film manufacturing method of the present invention has the following arrangement.

That is, a method of manufacturing a tubular film comprises the steps of winding a thermoplastic sheet film 5 to 300 $\mu$m in thickness on a columnar member so that leading and trailing ends of the film partially overlap each other, covering the wound film with a tubular molding member whose inner diameter is larger by 15 $\mu$m or more than an outer diameter of the columnar member, and connecting the overlapping portions of the film by holding at least the film within a temperature range from a melt temperature to a decomposition temperature thereof for a predetermined time.

According to the third aspect a tubular film manufacturing method of the present invention has the following arrangement.

That is, a method of manufacturing a tubular film comprises the steps of winding a thermoplastic sheet film on a columnar member, overlaying leading and trailing ends of the film on each other, and fitting a tubular molding member on the wound film, and placing the film, the columnar member, and the tubular molding member in a radio-frequency induction heating device and heating the sheet film, thereby connecting the overlapping portions of the leading and trailing ends of the film.

According to the fourth aspect a tubular film manufacturing method of the present invention has the following arrangement.

That is, a method of manufacturing a tubular film comprises the steps of winding a first thermoplastic sheet film a plurality of number of times on a columnar member so that leading and trailing ends partially overlap each other, winding a second thermoplastic sheet film a plurality of number of times on the wound first sheet film so that leading and trailing ends partially overlap each other, covering the first and second films with a tubular molding member, and connecting the overlapping portions by heating the first and second films to a temperature, at which the overlapping portions are connected, for a predetermined time, thereby forming a multilayered tubular film.

According to the fifth aspect a tubular film manufacturing method of the present invention has the following arrangement.

That is, a method of manufacturing a tubular film comprises the steps of winding a thermoplastic sheet film on a columnar member so that leading and trailing ends of the film partially overlap each other, fitting a thermoplastic tube on the sheet film, fitting a tubular molding member on the thermoplastic tube, and connecting the overlapping portions by heating at least the sheet film within a temperature range from a melt temperature to a decomposition temperature thereof.

According to the sixth aspect a tubular film manufacturing method of the present invention has the following arrangement.

That is, a method of manufacturing a tubular film comprises the steps of fitting a non-thermoplastic tube on a columnar member, winding a thermoplastic sheet film on the tube so that leading and trailing ends of the film partially overlap each other, fitting a tubular molding member on the sheet film, and connecting the overlapping portions by heating at least the sheet film within a temperature range from a melt temperature to a decomposition temperature thereof.

According to the seventh aspect a tubular film manufacturing method of the present invention has the following arrangement.

That is, a method of manufacturing a tubular film comprises the steps of fitting a non-thermoplastic first tube on a columnar member, fitting a thermoplastic second tube on the first tube, fitting a tubular molding member on the second tube, and connecting the overlapping portions by heating at least the sheet film within a temperature range from a melt temperature to a decomposition temperature thereof.

According to the eighth aspect a tubular film manufacturing method of the present invention has the following arrangement.

That is, a method of manufacturing a tubular film comprises the steps of winding a thermoplastic sheet film on a columnar member, butting leading and trailing ends of the film against each other, fitting a tubular molding member on the wound film, and connecting the butted portions of the film by heating at least the film, thereby forming the sheet film into a tubular film.

A tubular film manufacturing apparatus according to the present invention has the following arrangement.

That is, an apparatus for manufacturing a tubular film comprises a columnar member on which a thermoplastic sheet film is wound so that leading and trailing ends of the film partially overlap each other, a tubular molding member in which the film wound on the columnar member is fitted, and heating means for heating at least the film, wherein a tubular film is formed by connecting the overlapping portions of the film by heating the film by the heating means.

According to the first aspect a film for a fixing device of an image forming apparatus according to the present invention has the following arrangement.

That is, a film for a fixing device of an image forming apparatus is characterized in that the film is formed by thermally connecting two ends of a thermoplastic sheet film, and toner on an image carrier is fixed by pressurizing the toner between the film and a press member.

According to the second aspect a film for a fixing device of an image forming apparatus according to the present invention has the following arrangement.

That is, a film for a fixing device of an image forming apparatus is characterized in that the film is a multilayered tubular film formed by connecting two end portions of each of first and second thermoplastic sheet films, and toner on an image carrier is fixed by pressurizing the toner between the film and a press member.

According to the third aspect a film for a fixing device of an image forming apparatus according to the present invention has the following arrangement.

That is, a film for a fixing device of an image forming apparatus is characterized in that the film is a multilayered tubular film formed by connecting two end portions of a thermoplastic sheet film on an outer or inner surface of a thermoplastic tube, and toner on an image carrier is fixed by pressurizing the toner between the film and a press member.

According to the fourth aspect a film for a fixing device of an image forming apparatus the present invention has the following arrangement.

That is, a film for a fixing device of an image forming apparatus is characterized in that the film is a multilayered film formed by combining thermoplastic and non-thermoplastic tubes, and toner on an image carrier is fixed by pressurizing the toner between the film and a press member.

A fixing device of an image forming apparatus according to the present invention has the following arrangement.

That is, a fixing device of an image forming apparatus is characterized in that a tubular film is formed by connecting two end portions of a thermoplastic sheet member, the tubular film is driven in the form of a closed loop by pressing the film against a press roller, and a carrier which carries toner is inserted between the tubular film and the press roller, thereby fixing the toner.

A conveyor belt according to the present invention has the following arrangement.

That is, a conveyor belt is characterized in that a thermoplastic sheet film is wound into a cylindrical film so that leading and trailing ends of the film overlap each other to form overlapping portions, molding members are arranged on inner and outer circumferential surfaces of the cylindrical film, and the film is formed into a tubular belt by heating the film and the molding members.

According to the first aspect a conveyor device for an image forming apparatus according to the present invention has the following arrangement.

That is, a conveyor device for an image forming apparatus is characterized in that a thermoplastic sheet film is wound into a cylindrical film so that leading and trailing ends of the film overlap each other to form overlapping portions, molding members are arranged on inner and outer circumferential surfaces of the cylindrical film, the film is formed into a tubular belt by heating the film and the molding members, and the tubular belt is rotated by a driving roller and a press roller.

According to the second aspect a conveyor device for an image forming apparatus according to the present invention has the following arrangement.

That is, a fixing device for an image forming apparatus is characterized in that a thermoplastic sheet film is wound into a cylindrical film so that leading and trailing ends of the film overlap each other to form overlapping portions, molding members are arranged on inner and outer circumferential surfaces of the cylindrical film, the film is formed into a tubular belt by heating the film and the molding members, the tubular belt is rotated by a driving roller and a heating roller, and image fixing is performed by passing an image transfer medium between the heating roller and the tubular belt.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 29 is a view showing combinations of the materials of a columnar member and a tubular molding member;

FIG. 41 is a view showing comparison between the tensile strengths of film connected portions;

FIG. 45 is a view showing the thirteenth embodiment of the present invention;

FIG. 46 is a view showing the thirteenth embodiment of the present invention;

FIG. 47 is a view showing the thirteenth embodiment of the present invention;

DETAILED DESCRIPTION OF THE PREFERRED EMBODIMENTS

First Embodiment

Figure 1:
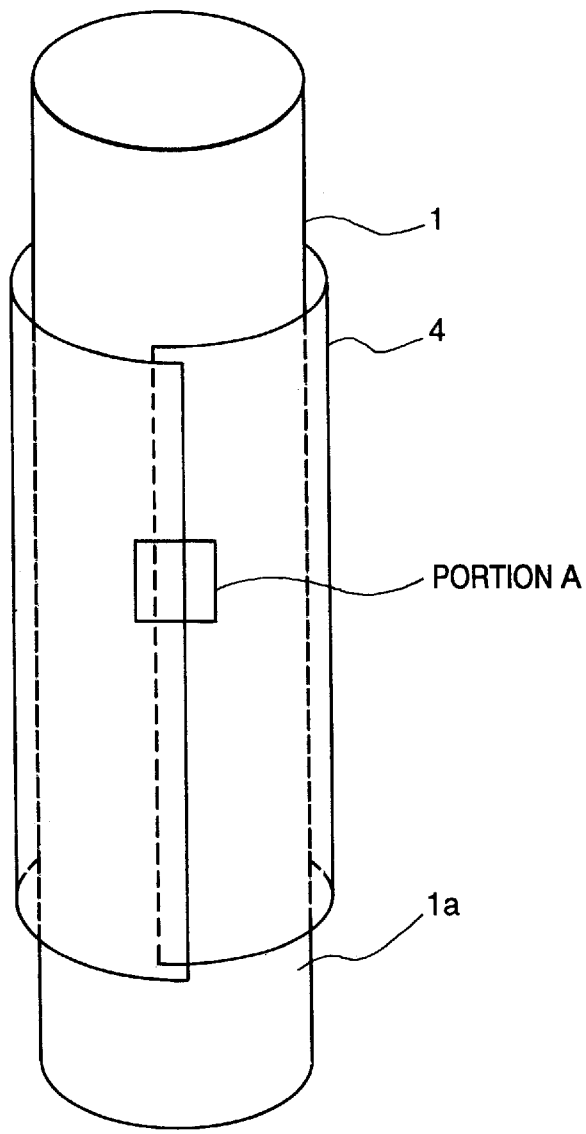
FIG. 1 is a view for explaining the state in which a sheet film is wound on a columnar member in the direction of section.

FIGS. 1 to 9 illustrate the first embodiment of the present invention.

Reference numeral 1 denotes a columnar member as a core on which a film 4 is wound. In this embodiment a solid bar is used as the columnar member 1. A tubular or hollow molding member 2 has an inner diameter which allows insertion of the columnar member 1. In this embodiment, an aluminum material is used for the columnar member, and stainless steel is used for the tubular molding member. It is preferable that the thermal expansion coefficient of the material of the columnar member 1 be larger than the thermal expansion coefficient of the material of the molding member 2.

Details of this embodiment will be described below. The dimensions of a sheet film were chosen in accordance with the inner diameter of a tubular film to be manufactured, and the dimensions of the columnar member 1 and the tubular molding member 2 were selected in accordance with the chosen dimensions of the sheet film. As the sheet film 4, a cut sheet 79 mm long and 270 mm wide of a thermoplastic material, in this embodiment polyetheretherketone (a biaxially oriented product), was prepared. The film thickness of the sheet film was 50 $\mu$m.

Aluminum with a thermal expansion coefficient of 2.4× $10^{-5}$ (/°C.) was used for the columnar member, and stainless steel with a thermal expansion coefficient of 1.5×$10^{-5}$ (/°C.) was used for the tubular molding member. The diameter and the length of the columnar member were 24.0 mm and 300.0 mm, respectively. The inner diameter, the outer diameter, and the length of the tubular molding member were 24.2 mm, 30.0 mm, and 300.0 mm, respectively.

The dimensions of the columnar member 1 and the tubular molding member 2 were so designed that the difference between the outer diameter of the columnar member 1 and the inner diameter of the tubular molding member 2 was 100 $\mu$m ±10 $\mu$m when the temperature was 370° C. during heating in a heating step (to be described later).

Figure 2:
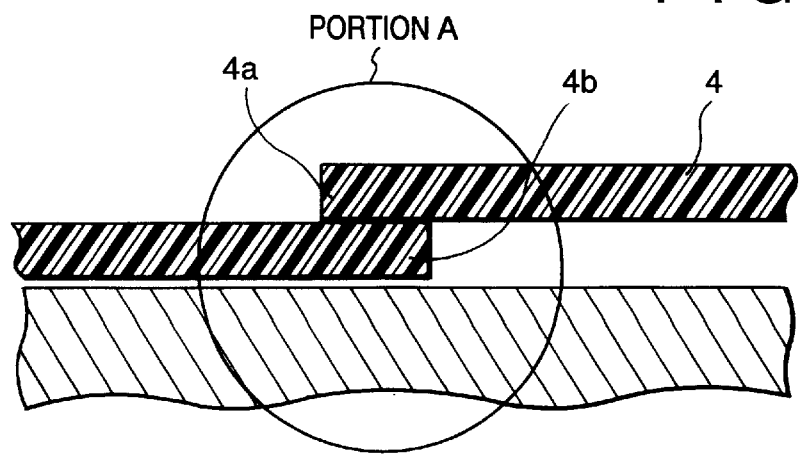
FIG. 2 is a view for explaining overlapping of the two end portions of a film wound on the outer circumferential surface of the columnar member.

As shown in FIG. 1, the sheet film 4 prepared as above was wound on an outer circumferential surface 1a of the columnar member 1 such that the two ends of the film overlapped each other as in FIG. 2. The width of the overlapping portion of the two ends, 4a and 4b, of the film 4 was about 4.0 mm.

Figure 4:
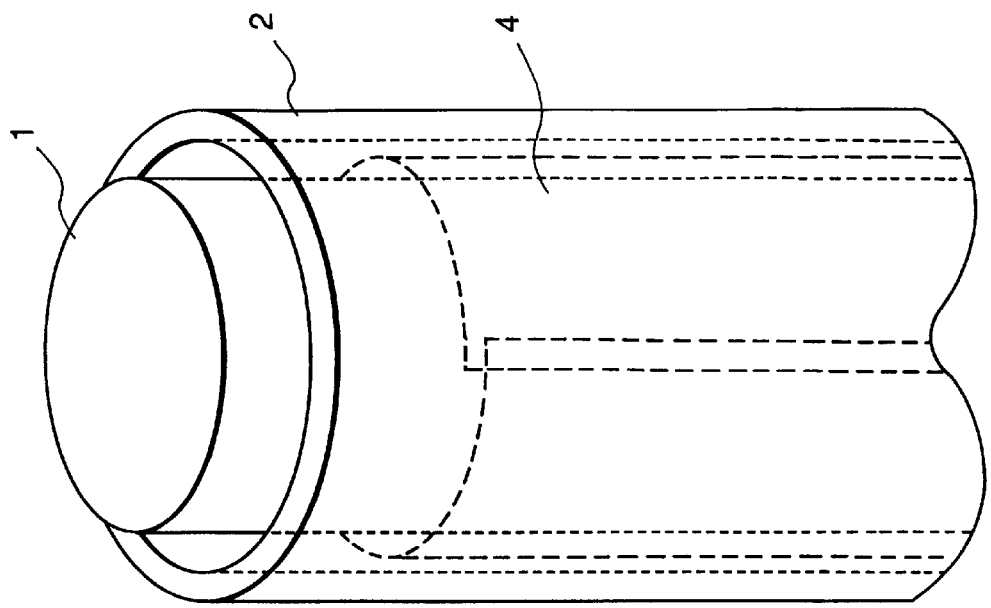
FIG. 4 is a view for explaining the state in which a sheet film wound on a columnar member is covered with a tubular molding member.
Figure 3:
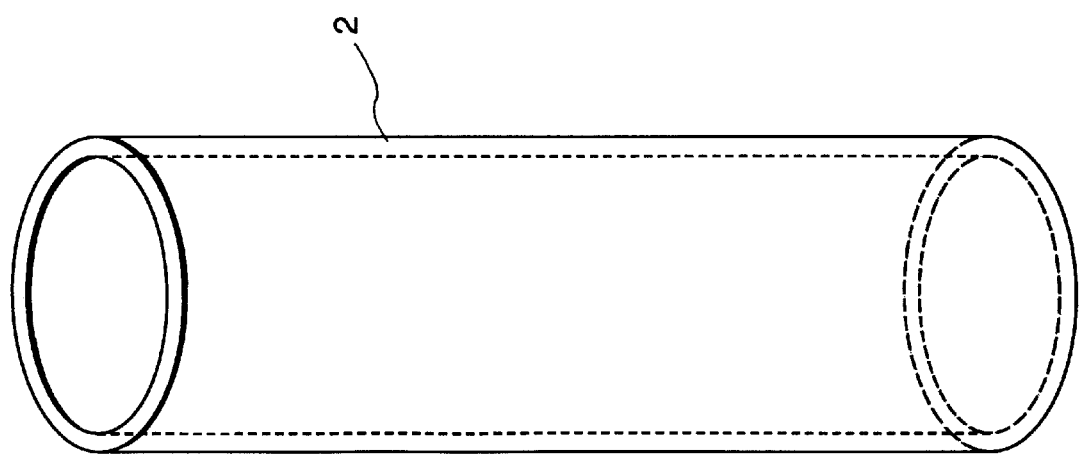
FIG. 3 is a view for explaining a combination of a columnar member and an annular molding member.
Figure 5:
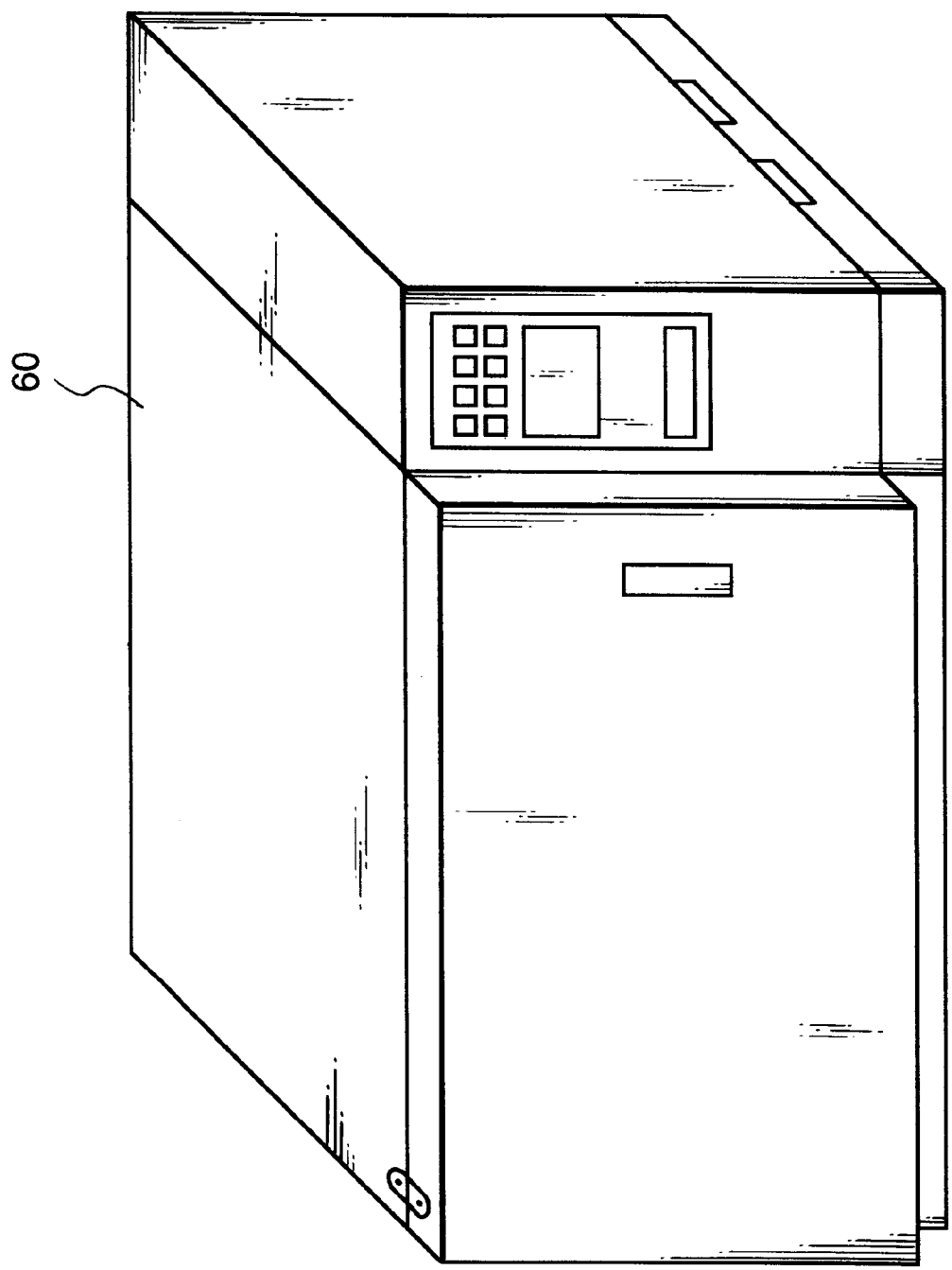
FIG. 5 is a view for explaining a heating oven for use in a heating step.

Subsequently, as illustrated in FIG. 4, the film 4 wound on the columnar member 1 was inserted into the hollow portion of the tubular molding member 2. The columnar member 1, the film 4, and the tubular molding member 2 were inserted into a heating oven 60, FIG. 5, and heated. Details of the structure of this heating oven 60 are illustrated in FIG. 28.

Figure 28:
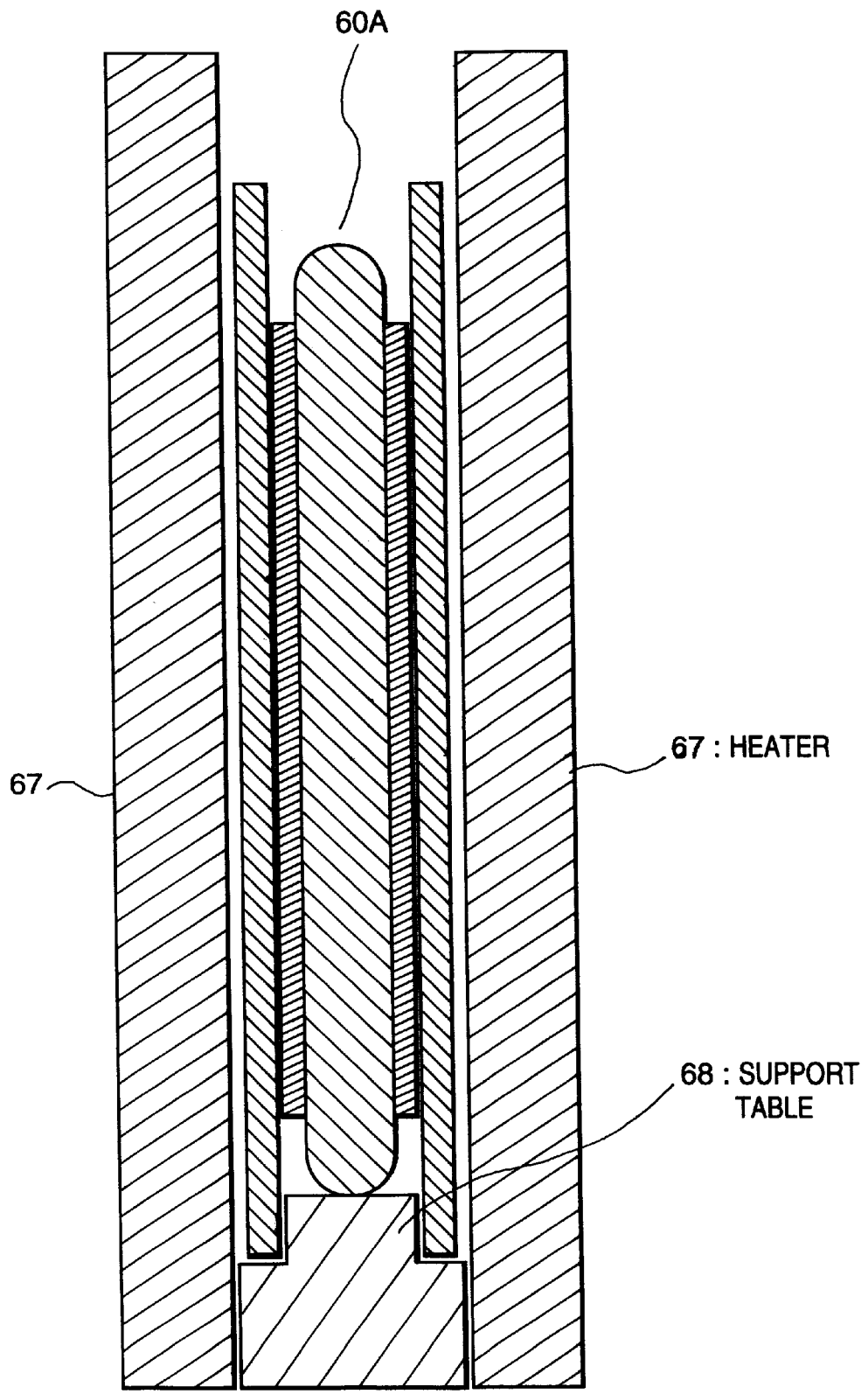
FIG. 28 is a sectional view of the major components of a heating oven used in the present invention.

Referring to FIG. 28, a support table 68 is fixed on a base (not shown) of the heating oven, heaters 67 are arranged on the support table 68, and a space 60A in which the objects to be heated (the columnar member, the film, and the tubular molding member) are arranged is formed between the heaters 67. The temperature of the heaters 67 is controlled by a temperature control means (not shown).

Figure 6:
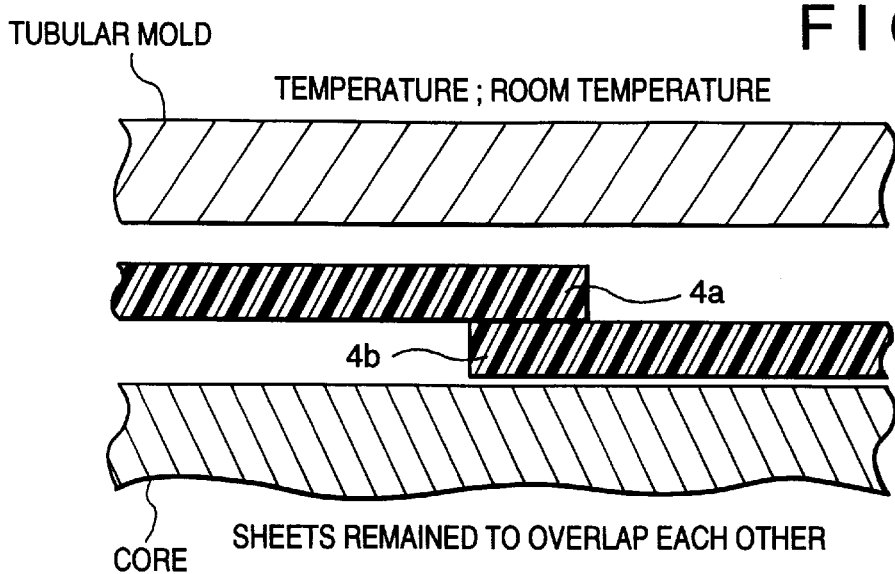
FIG. 6 is a view for explaining the way a sheet film is wound.
Figure 7:
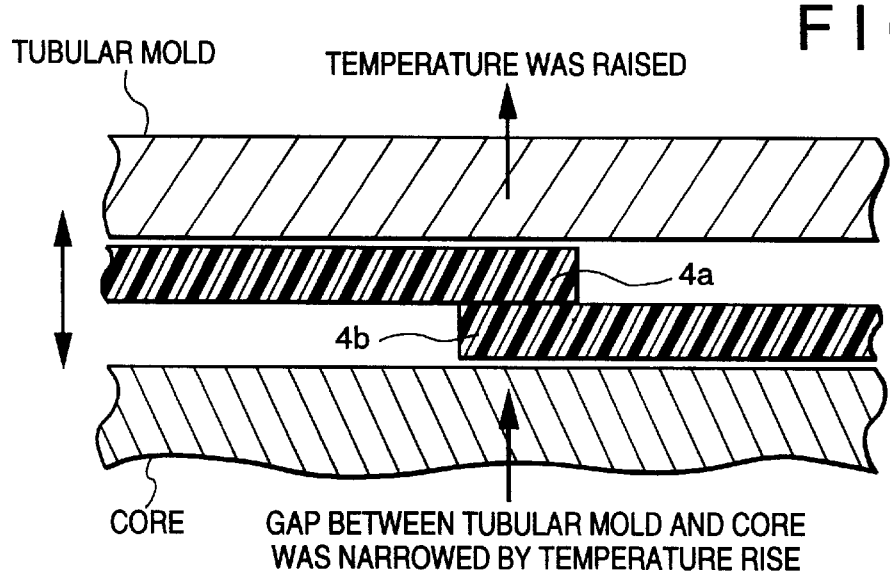
FIG. 7 is a view for explaining the state of a film between a columnar member and a tubular molding member.
Figure 8:
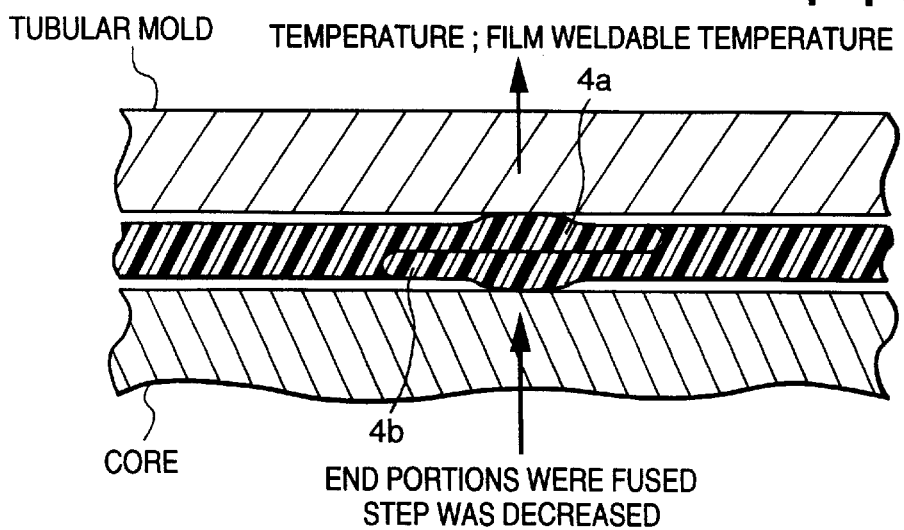
FIG. 8 is a view for explaining the state of heating.

The heating conditions in the heating oven 60 were that the heating temperature was 370±5° C. and the heating time was 30±1 min. The heating time was determined by taking account of the melt temperature (melting point) of the film material and the heat deterioration of the film. During the heating step in the heating oven 60, the film 4 changed as shown in FIGS. 6 to 8. First, the film 4 placed in the heating oven 60 was wound in the gap between the columnar member 1, as a core, and the tubular molding member 2, and the two ends 4a and 4b formed the overlapping portion. The dimensional gap between the outer diameter of the columnar member 1 and the inner diameter of the tubular molding member 2 was 200 $\mu$m. The columnar member 1, the film 4, and the tubular molding member 2 were heated from this state, and the temperatures of these members rose. The columnar member 1 and the tubular molding member 2 began expanding in accordance with the respective thermal expansion coefficients (FIG. 6). The film 4 started softening as the temperature rose, and the columnar member 1 and the tubular molding member 2 started expanding with the temperature rise. However, since the thermal expansion coefficient of the aluminum material of the columnar member 1 was larger than the thermal expansion coefficient of the tubular molding member 2, the dimensional gap between the outer diameter of the columnar member 1 and the inner diameter of the tubular molding member 2 was narrowed from that in the initial low-temperature state (FIG. 7).

As the gap between the columnar member and the tubular molding member was narrowed, the film sandwiched between them more and more softened. The overlapping portion of the two ends 4a and 4b of the film was extended in the circumferential direction of the columnar member 1 due to softening of the film and narrowing of the gap, and the overlapping portions 4a and 4b were welded and connected. Note that the gap between the columnar member and the tubular molding member finally became the same as a desired film thickness to thereby eliminate the step in the overlapping portion (FIG. 8).

Figure 9:
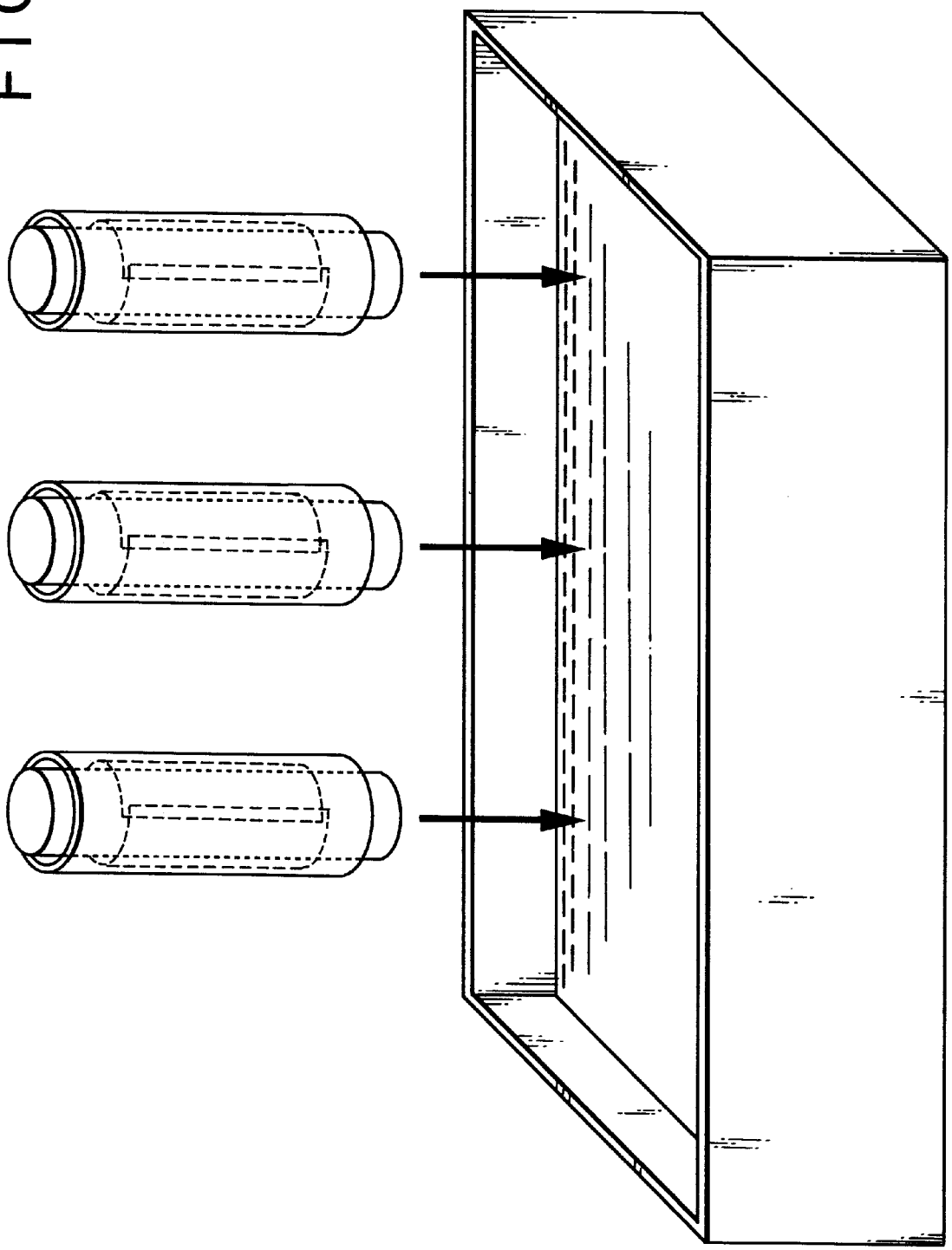
FIG. 9 is a view for explaining the state of cooling.

Thereafter, the film 4 was kept heated at a predetermined temperature, and the spread of the film thickness was adjusted by the decrease in the gap between the columnar member 1 and the tubular molding member 2 caused by the expansion. When the heating time of 30 min elapsed, heating was stopped, and a cooling step was started (FIG. 9).

During cooling done in this cooling step, the columnar member 1, the film 4, and the tubular molding member 2 can be naturally cooled after heating in the heating step is stopped. However, rapid cooling also can be performed to shorten the cooling time.

In this embodiment, after being heated the individual members were dipped into a coolant in a liquid bath and cooled at a cooling rate of 300° C. /min.

After the cooling temperature became almost room temperature, the film was removed from between the columnar member and the tubular molding member. The result was that the removed film was finished into a tubular (cylindrical) shape and the overlapping portions 4a and 4b of the original sheet film were well connected. Also, the film thickness was as uniform as approximately 50 $\mu m \pm 5$ $\mu m$ throughout the tubular film.

Uses of the tubular film 4 manufactured by the above method will be described below.

Figure 10:
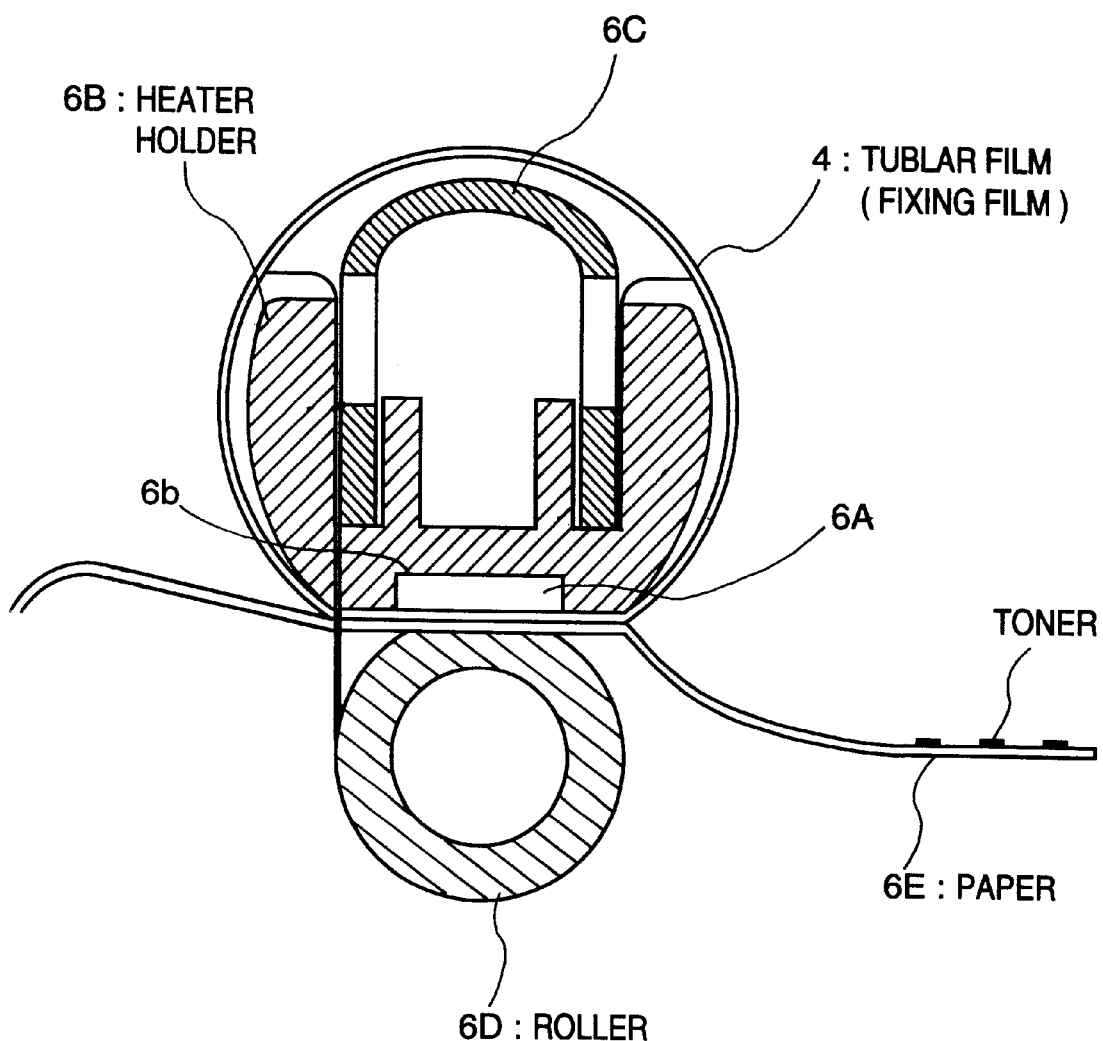
FIG. 10 is a view for explaining a fixing device of an image forming apparatus which uses the film of the present invention.

FIG. 10 illustrates an example in which the tubular film 4 is used in a fixing device of an image forming apparatus (LBP: Laser Beam Printer). In FIG. 10, reference numeral 4 denotes the tubular film (fixing film) according to the present invention. A heater 6A for heating the fixing film 4 is held by a heater holder 6B. A stay member 6C is formed into a substantially U shape. The fixing film 4 is so assembled as to be fitted on the outer circumferential surfaces of the stay member 6C and the heater holder 6B. A press roller 6D is driven by a driving means (not shown). In this fixing device shown in FIG. 10, a carrier 6E such as a paper sheet which carries toner for forming an image is conveyed and inserted between the fixing film 4 and the press roller 6D. Heat of the fixing film applied by the heater is conducted to the toner, and the toner is fixed on the paper sheet by pressure and heat. In the fixing film according to the present invention, the film thickness had a high uniformity, and the thickness of the overlapping portion of the sheet film was not different from the thickness of the rest of the film. Accordingly, heat was uniformly conducted from the film to the toner, resulting in a very high image quality.

Figure 24:
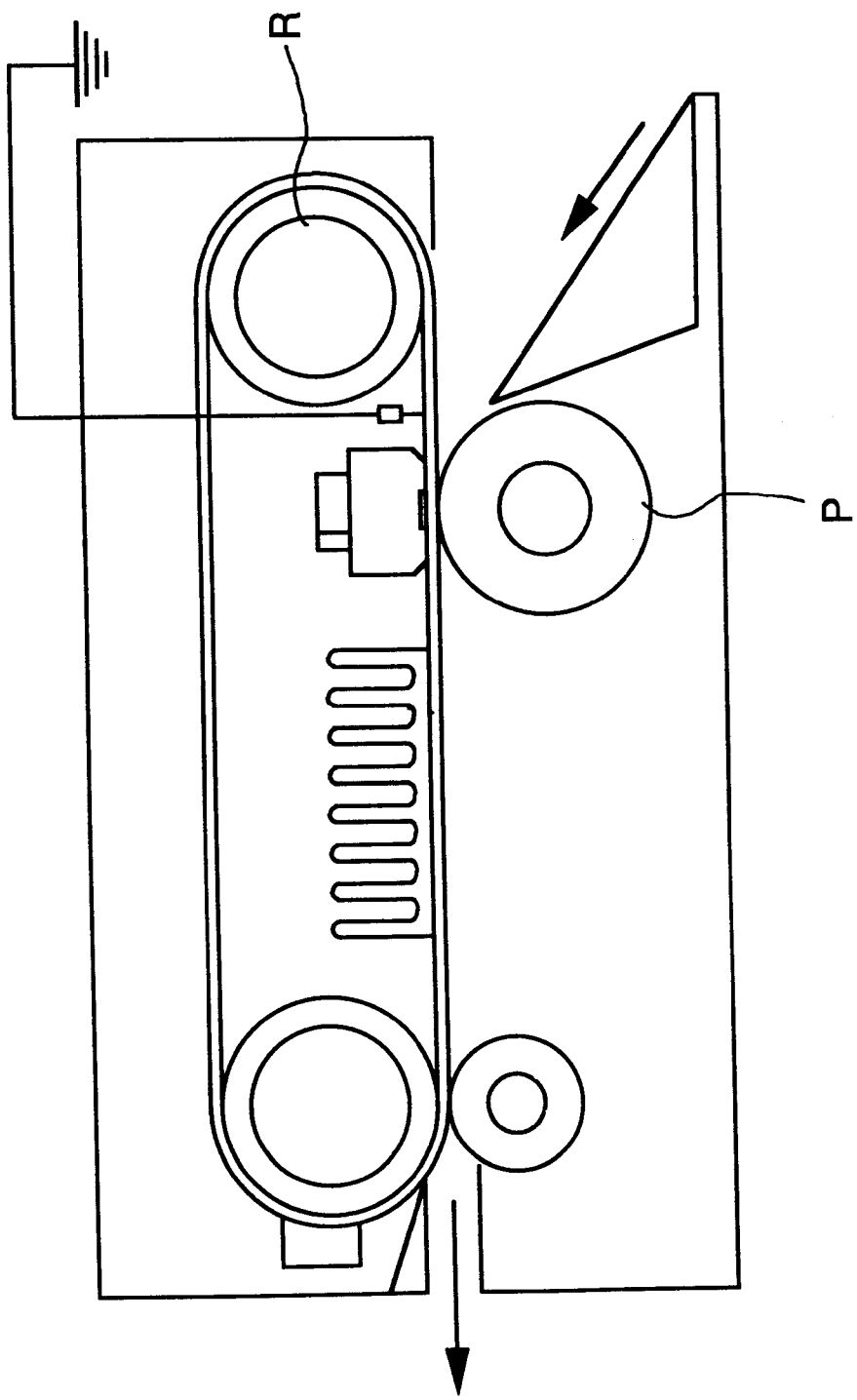
FIG. 24 is a view for explaining a fixing device using the films manufactured by the embodiments of the present invention.

FIG. 24 shows another example of an image forming apparatus as one application of the tubular film according to the present invention.

FIG. 24 shows a fixing device of a copying machine, and details of this fixing device are described in Japanese Patent Laid-Open No. 63-313182.

In the fixing device shown in FIG. 24, the film 4 is so arranged as to have a rhombic section between driving rollers R. Upon receiving rotation transmitted by the driving force from one of these driving rollers, the film 4 rotates and fixes toner on a paper sheet while conveying the sheet between the film 4 and a heating press roller P. In the fixing device shown in FIG. 24, the tubular film is used in a flat state.

Film materials usable in this embodiment will be described below.

Examples of the thermoplastic resin material are polyethylene, polypropylene, polymethylpentene-1, polystyrene, polyamide, polycarbonate, polysulfone, polyallylate, polyethyleneterephthalate, polybutyleneterephthalate, polyphenylenesulfide, polyethersulfone, polyethernitrile, a thermoplastic polyimide-based material, polyetheretherketone, a thermotropic liquid crystal polymer, and polyamide acid. It is also possible to use a film formed by mixing at least one type of fine organic and inorganic powders in any of these resin materials in order to improve the heat resistance, the conductivity, and the thermal conductivity.

Condensed polyimide is an example of the organic powder. Preferred examples of the inorganic powder are inorganic spherical fine particles such as a carbon black powder, a magnesium oxide powder, a magnesium fluoride powder, a silicon oxide powder, an aluminum oxide powder, and a titanium oxide powder, fibrous particles such as a carbon fiber and a glass fiber, and a whisker powder such as potassium hexatitanate, potassium octatitanate, silicon carbide, and silicon nitride.

The total mixing amount of these fine powders is preferably 5 to 50 wt % of the base resin. The above film material is inserted and mound between the columnar member and the tubular molding member, softened by heating, and compressed. To ensure the uniformity of the thickness of the resultant tubular film and facilitate release of the film from the tubular molding member, a material having a mold shrinkage factor ranging between 0.6 and 2.0% was used. As a result, the uniformity described above was assured.

The mold materials will be described below.

In this embodiment, aluminum and stainless steel are proposed as the materials of the columnar member and the tubular molding member, respectively. However, the present invention can also be practiced by using combinations of resin materials, such as polytetrafluoroethylene, and glass materials, in addition to the above materials. FIG. 29 shows favorable examples of combinations of the materials of these members.

Second Embodiment

Figure 11:
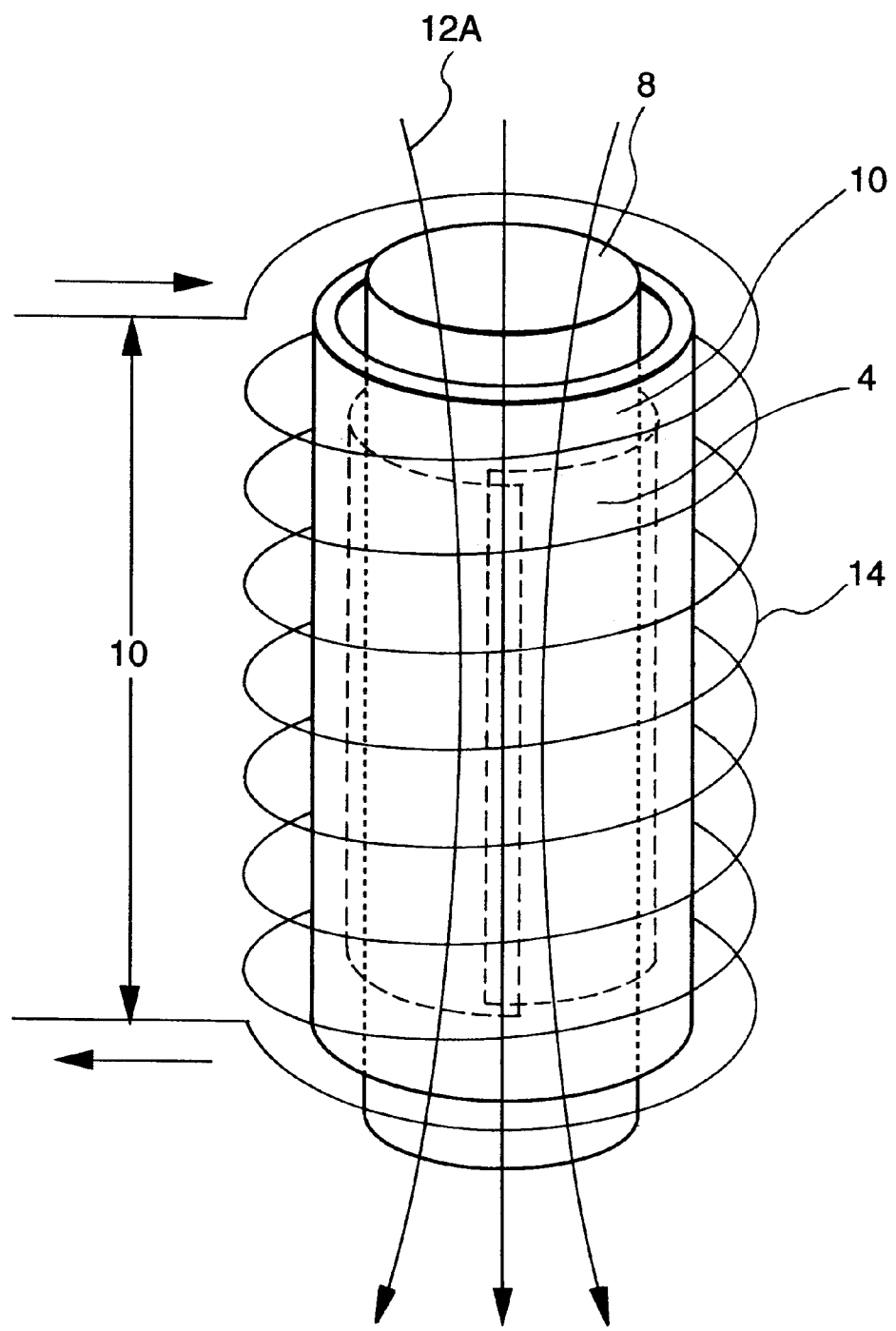
FIG. 11 is a view for explaining the second embodiment of the present invention.

FIG. 11 illustrates the second embodiment of the present invention.

The characteristic feature of this embodiment is to perform radio-frequency induction heating. In this embodiment the productivity is improved by heating the columnar member, the tubular molding member, and the film within short timer periods.

In FIG. 11, reference numeral 8 denotes an aluminum columnar member; and 10, a stainless-steel tubular molding member. The thermal expansion coefficients and the dimensions of the columnar member 8 and the tubular molding member 10 were identical with those in the first embodiment.

A polyetheretherketone sheet film having the same dimensions as in the first embodiment was wound on the outer circumferential surface of the columnar member 8 so that the two ends of the film overlapped each other. The columnar member 8 and the film thus assembled were inserted into the tubular molding member 10, and the tubular molding member 10 was placed in the hollow coil holder described above.

The surface temperature of the tubular molding member 10 was controlled at 370° C. by supplying power to the coil at a frequency of 1 MHz and a power of 8 kw for five sec. By this radio-frequency induction heating, the overlapping portions of the film wound between the columnar member 8 and the tubular molding member 10 were welded and connected due to a decrease in the gap between the columnar member and the tubular molding member caused by the temperature rise, softening caused by the temperature rise of the film, and compression resulting from the decrease of the gap.

Thereafter, the supply of power to the coil was stopped, cooling was performed in accordance with the method shown in FIG. 9, and the film was removed from the columnar member and the tubular molding member. The result was that the film assumed a perfectly cylindrical shape and the film thickness accuracy also was high. The radio-frequency induction heating means of this embodiment was able to increase the temperature from room temperature to a predetermined heating temperature within a very short time period. The materials described in the first embodiment can be used as the film material.

Application of Second Embodiment

When the film manufactured by this embodiment is used as the fixing film for the fixing devices of the image forming apparatuses shown in FIGS. 10 and 24, toner on a paper sheet as a toner carrier is pressurized by the fixing film and the press roller. In this case, if the intermolecular attraction and the electrostatic attraction acting between the fixing film and the toner are large, a phenomenon (called a toner offset phenomenon) in which the toner on the paper sheet is attracted to the fixing film takes place. Since the toner is removed from the paper surface, the definition of image information is largely influenced. This application provides a film having a large effect of preventing this toner offset of the fixing film.

Film coating for preventing toner offset is performed on the outer circumferential surface of the tubular film manufactured by the second embodiment. This film coating is done by using a low-energy layer material such as a fluorine resin layer, a fluorine rubber layer, or a silicone rubber layer.

More specifically, 0.4 wt % of carbon black was blended in a 3:7 mixture of PFA (tetrafluoroethylene and a perfluoroalkylvinylether copolymer) and PTFE (polytetrafluoroethylene). The thickness of the coating film was $10 \pm 1$ $\mu$m in the case of a fluorine resin layer and $4 \pm 1$ $\mu$m in the case of a resin mixture of PFA and PTFE. The method of film coating was dipping or spraying.

When the films thus manufactured by the method of this application were used as films of the fixing devices shown in FIGS. 10 and 24, it was possible to eliminate the problem of toner offset.

In the above embodiment, the molded film was well removed when the accuracy of the surface roughness of the inner surface of the tubular molding member 10 was set to less than 3 $\mu$m as a ten-point average roughness Rz.

Third Embodiment

Figure 13:
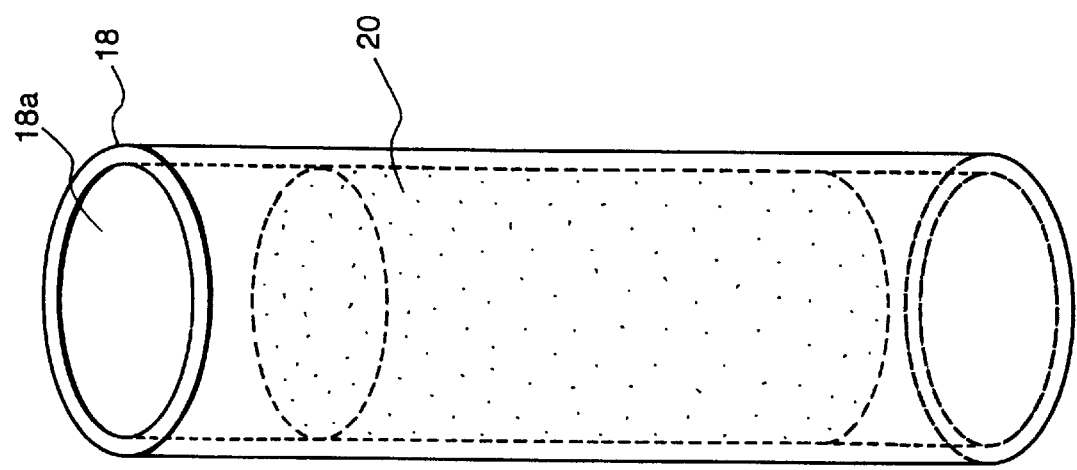
FIG. 13 is a view showing the third embodiment of the present invention.
Figure 12:
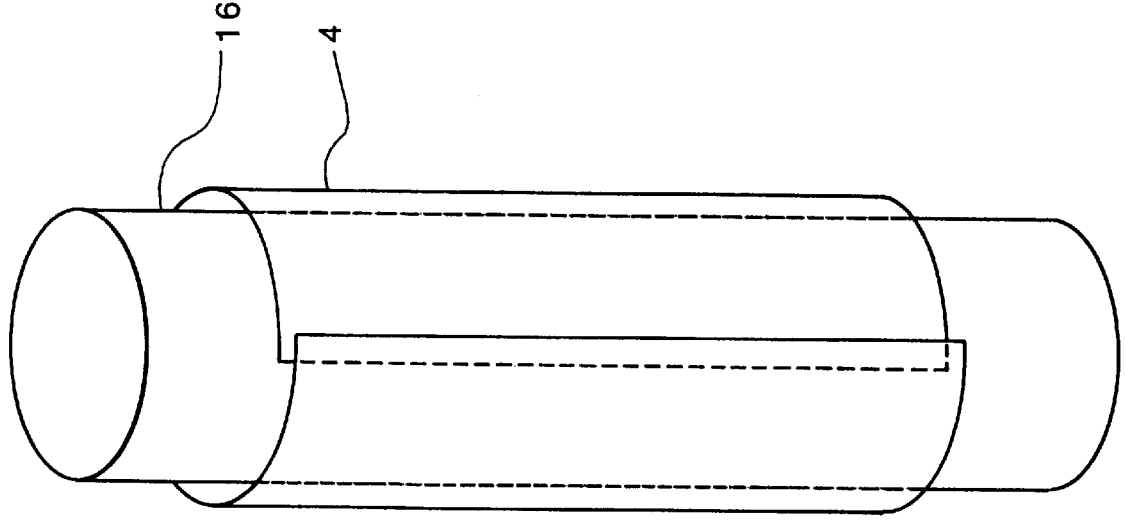
FIG. 12 is a view showing the third embodiment of the present invention.

FIGS. 12 and 13 illustrate the third embodiment in which the releasability of a film is improved.

Reference numeral 16 denotes a columnar member made from an aluminum material and having the same thermal expansion coefficient as in the first embodiment; and 18, a tubular molding member made from stainless steel and having the same thermal expansion coefficient as in the first embodiment. A releasing agent 20 was coated on an inner circumferential surface 18a of the tubular molding member 18. The material of the releasing agent 20 is preferably an organic material such as a silicone resin or a fluorine resin, or an inorganic material such as graphite or boron nitride. The film thickness of the releasing agent 20 was substantially 5 $\mu$m.

As a sheet film, a 50-$\mu$m thick polyetheretherketone film cut into the same dimensions as in the first embodiment was used.

The outer diameter of the columnar member 16 and the inner diameter of the tubular molding member 18 were so designed that the gap size including the releasing agent was 100 $\mu$m when the temperature was 370° C. The sheet film was wound on the outer circumferential surface of the columnar member 16 so that the leading and the trailing ends of the film partially overlapped each other. The film was covered with the tubular molding member 18, and the resultant structure was placed in the heating oven, FIG. 28. In the heating oven heating was done at 370° C. for 30 min.

By this heating in the heating oven, the columnar member and the tubular molding member expanded, and the film softened. The gap was narrowed by the difference between the thermal expansion coefficients. The combined effect of narrowing of the gap, softening of the film, and compression between the columnar member and the tubular molding member connected the film end portions and uniformized the film thickness.

In each embodiment of the present invention, molding was performed at a very high resin melt temperature. Accordingly, it was necessary to protect the core member and the tubular mold from heat under the high-temperature conditions. The releasing agent was used to solve this problem, and consequently very good results were attained in the durability of the mold and the releasability of the film from the mold.

When the heating time described above elapsed, the tubular molding member, the film, and the columnar member were removed from the oven and cooled. When a predetermined cooling temperature of 40° C. was reached, the tubular molding member was removed, and then the film finished into a tubular, cylindrical shape was pulled out from the columnar member.

In this embodiment, the molded tubular film was smoothly released from the individual molding members. Also, the degree of contamination of each molding member was low after the film was released, resulting in improvements in the mold cleaning treatment and the mold durability.

Fourth Embodiment

Figure 15:
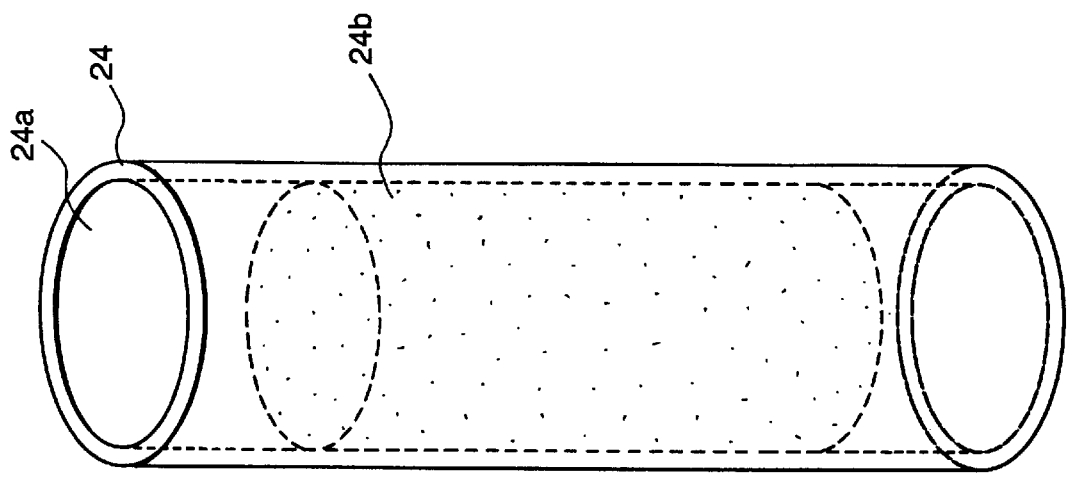
FIG. 15 is a view showing the fourth embodiment of the present invention.
Figure 14:
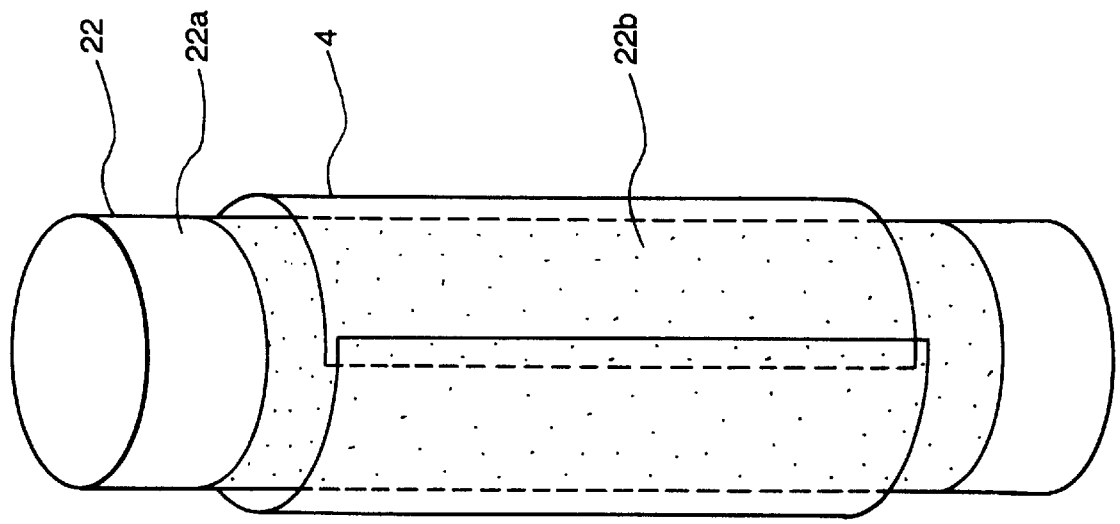
FIG. 14 is a view showing the fourth embodiment of the present invention.

FIGS. 14 and 15 show the fourth embodiment of the present invention. The purpose of this embodiment is to improve the releasability. Each embodiment described above is based on the principle that a film with a micron-order thickness placed between a columnar member and a tubular molding member is welded by heating and softening the film. The adhesion of the film is improved in the cooling step after heat-welding. Mold release must be carefully performed and hence requires a long release time, leading to a long manufacturing time. This embodiment proposes a method and an apparatus for solving this problem.

In FIGS. 14 and 15, a cylindrical member 22 was made from an aluminum material with a thermal expansion coefficient of $2.4 \times 10^{-5}$ (/°C.) and processed to have a diameter of 23.4 mm. A tubular molding member 24 was made from stainless steel with a thermal expansion coefficient of $1.5 \times 10^{-5}$ (/°C.) and processed to have an inner diameter of 24 mm and an outer diameter of 30 mm.

A 2-$\mu$m thick condensed polyimide resin film 22b was coated on a surface 22a of the columnar member 22. Also, a 7-μm thick graphite powder sintered film 24b was formed on an inner surface 24a of the tubular molding member 24. Coating was thus performed for each of the columnar member and the tubular molding member, so that the difference between the outer diameter and the inner diameter was set to 100 μm when the two members were heated to 270° C.

A polyethersulfone sheet film having the same dimensions as in the first embodiment was wound on the outer circumferential surface of the columnar member 22, such that the leading and the trailing ends of the film overlapped each other. The film and the columnar member were fitted in the tubular molding member 24, and the resultant structure was placed in a heating oven. In the heating oven a heat treatment was performed at 270° C. for 30 min.

By this heat treatment the columnar member 22, the tubular molding member 24, and the film were heated. As a consequence the overlapping portions of the film were connected due to narrowing of the gap, softening of the film, and compression caused by the temperature rise of the columnar member and the tubular molding member.

After the above heating time elapsed, the resultant structure was removed from the heating oven and cooled at a cooling rate of 250° C./min. When one minute elapsed from the start of cooling, the film was removed from the columnar member and the tubular molding member. As a result, the film was smoothly released from these members.

In this embodiment the releasability was improved because coating was performed for each of the columnar member and the tubular molding member.

Fifth Embodiment

This embodiment relates to a method and an apparatus for obtaining a multilayered tubular film. In each of the above first to fourth embodiments, a tubular film is manufactured from a single sheet film. In this embodiment, a tubular film is formed from a plurality of sheet films. Various types of machines using different image formation processes are available as an image forming apparatus, in which the tubular film of the present invention is significantly effective and which is one object of development by the present invention, and the thickness of a fixing film varies from one type of machine to another accordingly. For example, the thickness of a fixing film for a copying machine is required to be 20 μm, and that for a laser beam printer is required to be 50 μm. Also, the patent publication mentioned previously describes that the thickness of a fixing film is 9 μm. Therefore, this embodiment proposes a method of ensuring a high thickness uniformity of tubular films different in thickness.

Figure 16:
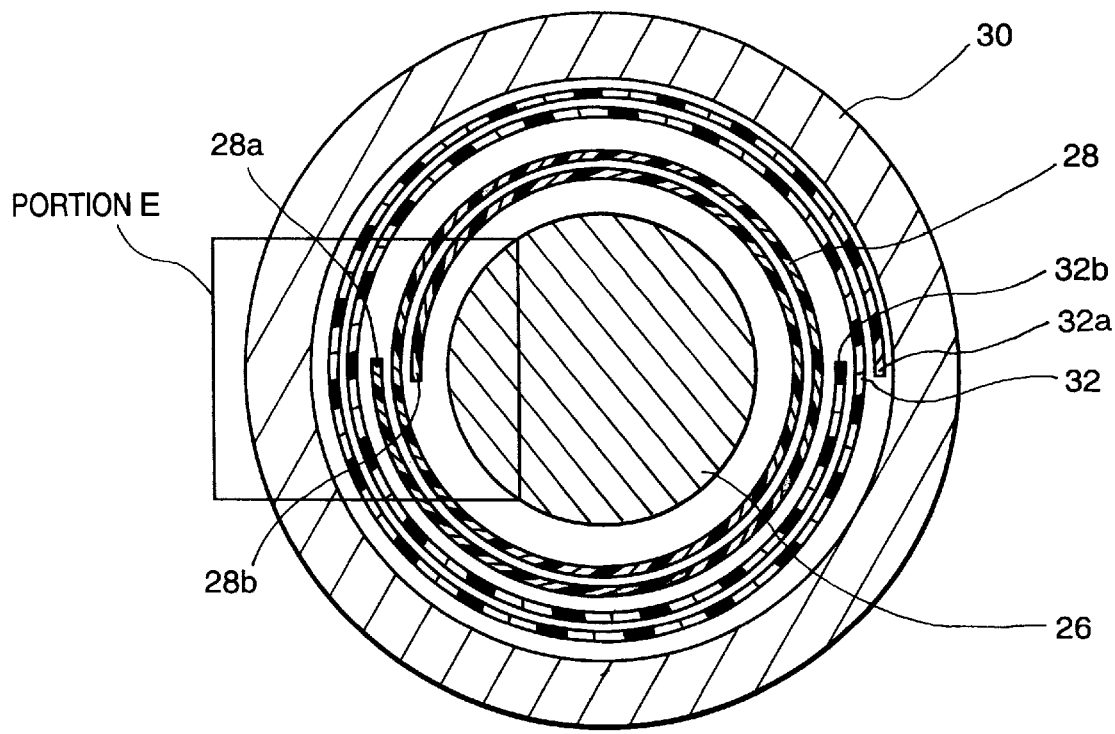
FIG. 16 is a view for explaining the fifth embodiment of the present invention.

In FIG. 16, reference numeral 26 denotes a columnar member made from a polytetrafluoroethylene resin. The stainless steel described above was used as a tubular molding member 30. The outer diameter of the columnar member 16 and the inner diameter of the tubular molding member 30 were so designed that the gap between the two members was 200 μm when they were heated at 290° C. for 30 min. A first sheet film 28 to be wound on the outer circumferential surface of the columnar member 26 was a 25-μm thick polyethersulfone cut sheet having predetermined dimensions.

A second sheet film 32 was made from tetrafluoroethylene and a perfluoroalkylvinylether copolymer (to be abbreviated as PFA hereinafter) and having a thickness of 25 μm.

The first sheet film 28 was wound double on an outer circumferential surface 26a of the columnar member 26 such that two ends 28a and 28b of the film overlapped each other. Subsequently, the second sheet film 32 was wound double on the first sheet film 28 such that two ends 32a and 32b of the film 32 overlapped each other. Double-winding of this embodiment has the merit of being able to form a tubular film with an arbitrary thickness independently of the thicknesses of the sheet films. Additionally, when a 50-μm thick film but a film is not used having a half thickness, i.e., a thickness of 25 μm is used as the sheet film, the thickness of the overlapping portion of the two ends of the film becomes small, so it is possible to manufacture a film having a high uniformity in the overall film thickness.

Figure 17:
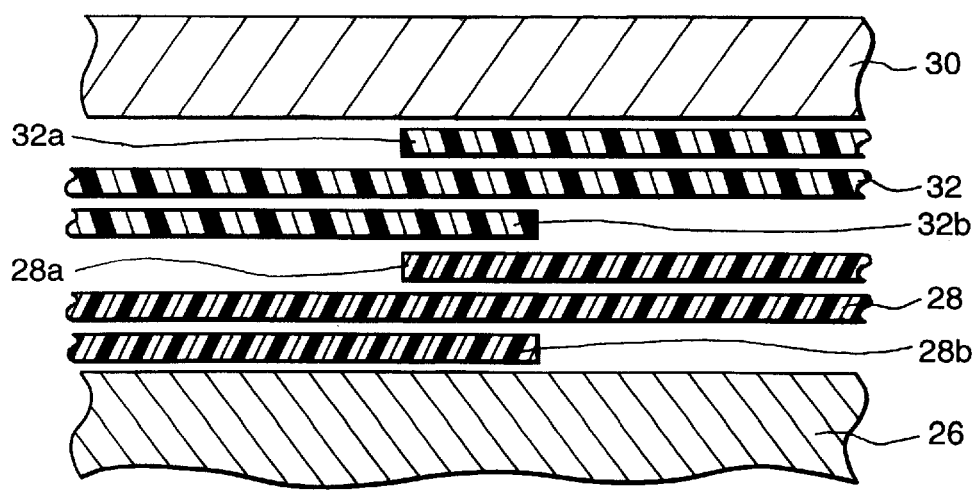
FIG. 17 is a view for explaining the fifth embodiment of the present invention.
Figure 18:
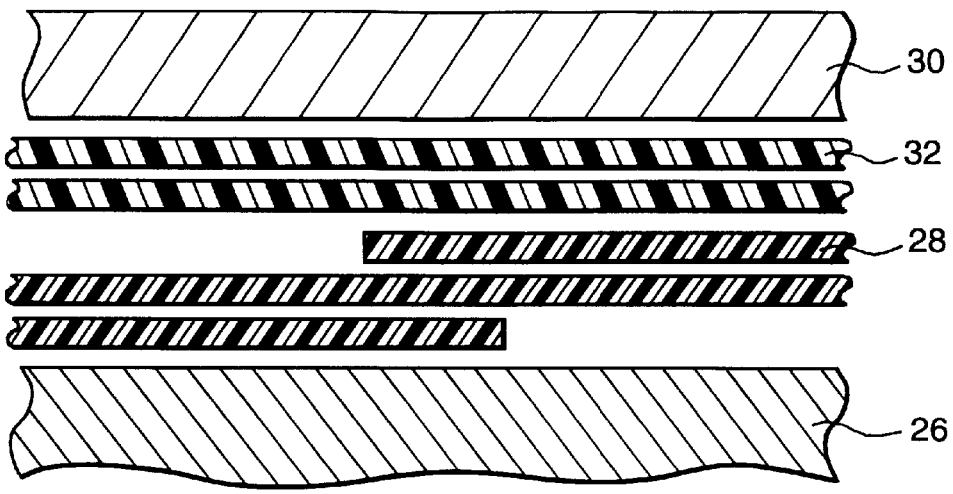
FIG. 18 is a view for explaining the fifth embodiment of the present invention.
Figure 19:
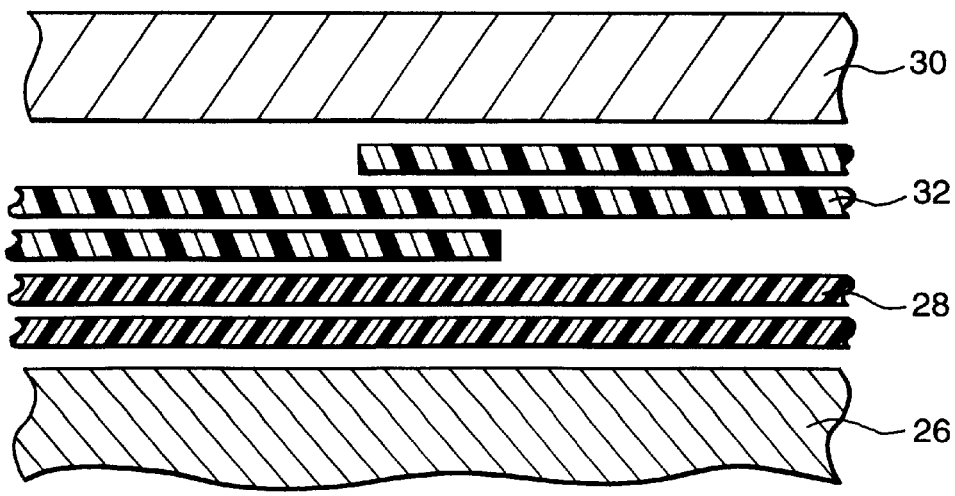
FIG. 19 is a view for explaining the fifth embodiment of the present invention.

As the method of winding the following two methods are possible: in one the first and second sheet films are so wound that the respective overlapping portions overlap each other in a certain section (FIG. 17); in the other the two sheet films are so wound that the respective overlapping portions do not overlap (FIGS. 18 and 19). In the method shown in FIG. 17 in which the ends of the two sheet films overlapped at the same point, the pressure from the columnar member in these overlapping portions became higher than that in the rest, so the columnar member deviated due to the counterforce. As a result, the uniformity of the film thickness was impaired in some instances. In the sheet film winding method illustrated in FIGS. 18 and 19, it was possible to avoid this problem since the overlapping portions of the sheet films were uniformly distributed. After the second sheet film was wound by either of the methods shown in FIG. 17 and FIGS. 18 and 19, these films were inserted into the tubular molding member 30. The resultant structure was placed in the heating oven and heated at a temperature of 290° C. for 30 min. In this heating step, both the columnar member 26 and the tubular molding member 30 were heated to produce a dimensional expansion difference resulting from the difference in the thermal expansion coefficient between the respective materials. As a consequence, the gap between the two members was narrowed. At the same time, the first and second sheet films were softened by heating and thereby the end portions of each film welded, resulting in two tubular films.

In the above heating step, the first and second sheet films were heated to 290° C. and softened. The gap was narrowed by the difference between the thermal expansion coefficients of the respective materials, and so the films were softened and connected. After the predetermined heating time elapsed, the columnar member, the films, and the tubular molding member were removed from the heating oven and cooled. After cooling, the films were pulled out from the columnar member and the tubular molding member, and it was found that a film having a uniform thickness of 100 μm all over the film was obtained. In this embodiment, the adhesion between the first and second films is not a strong bond such as a chemical bond but a weak bond resulting only from an intermolecular force bond. However, since the surfaces of the two films are once melted, they are bonded by an anchor effect resulting from these roughened surfaces.

Sixth Embodiment

This embodiment proposes a tubular film with an arbitrary film thickness and a method of manufacturing the film. A copying machine and a laser beam printer are examples of image forming apparatuses, and fixing films with film thicknesses of 34 and 64 μm, for example, are used in the former and the latter machines, respectively. That is, different types of image forming apparatuses use films different in film thickness. Also, the number of types of film thicknesses of films for use in fixing devices of image forming apparatuses can be increased in the future.

Figure 20:
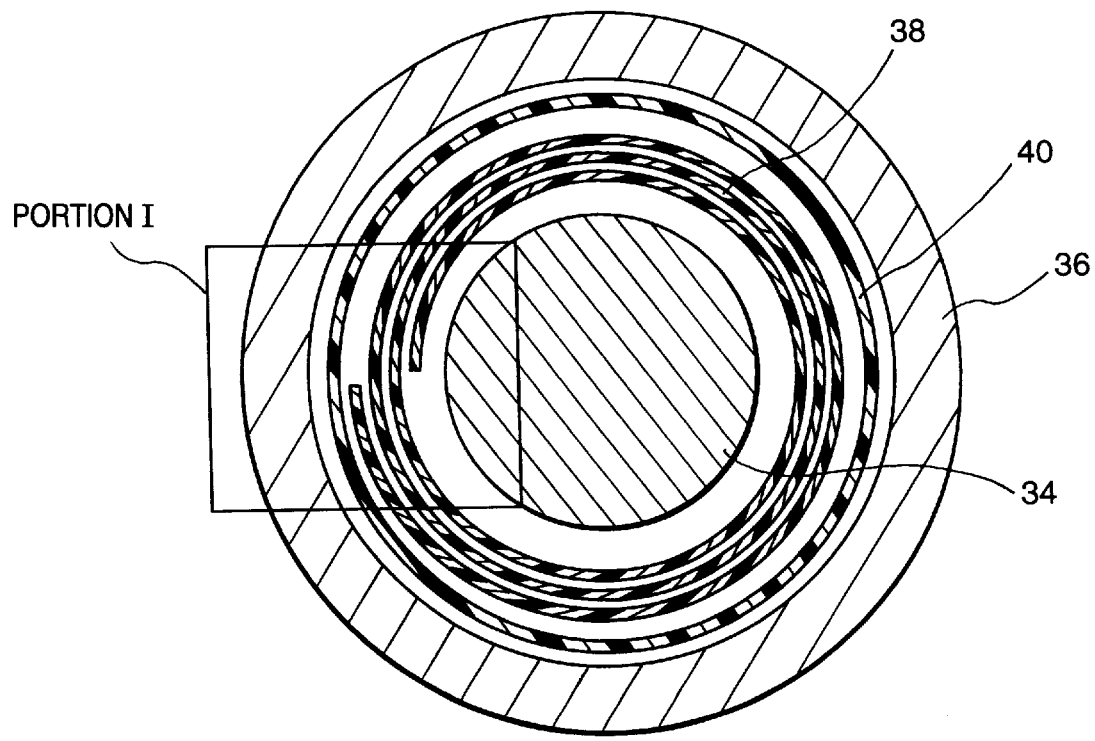
FIG. 20 is a view for explaining the sixth embodiment of the present invention.
Figure 21:
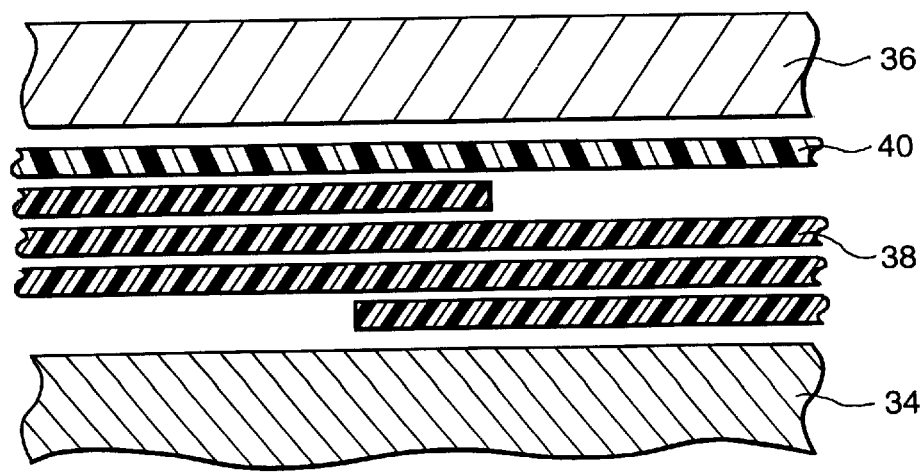
FIG. 21 is a view for explaining the sixth embodiment of the present invention.

FIGS. 20 and 21 illustrate this embodiment. A first molding member 34 was manufactured by coating a condensed polyimide coating on the outer circumferential surface of an aluminum columnar cylinder. A tubular molding member 36 was made from stainless steel described previously. The outer diameter of the columnar member 34 and the inner diameter of the tubular molding member 36 were so designed that the gap between the two members was 160 μm when they were heated at a temperature of 370° C. for 30 min.

A cut sheet of a 20-μm thick polyetheretherketone film, i.e., a sheet film 38 was wound triply on the outer circumferential surface of the columnar member 34. The sheet film 38 was so wound that the leading and trailing ends of the film overlapped each other in a certain section (portion I). The sheet film thus wound was covered with a tubular film 40. This tubular film 40 was made from PFA described previously. The tubular film can be manufactured by either the method described in the first embodiment or some other method. In this embodiment, the thickness and the diameter of the tubular film 40 were 20 μm and approximately 25 mm, respectively. After the tubular film 40 was fitted on the sheet film, the resultant structure was placed in a heating oven and heated at a temperature of 370° C. for 30 min.

In this heating step, both the columnar member 34 and the tubular molding member 36 were heated to 370° C. and expanded, and the gap between them was narrowed due to the difference between the respective thermal expansion coefficients. The films 38 and 40 sandwiched between the columnar member 34 and the tubular molding member 36 were heated and softened. Due to the decrease in the gap between these members and softening of the films, the overlapping portions at the two ends of the sheet film 38 were welded and connected, and the two films also welded. Consequently, these two types of films integrated and formed a single tubular film (FIG. 21). After the above predetermined heating time elapsed, the resultant structure was removed from the heating oven and cooled. The cooling conditions in this embodiment were that when the core member 34 was a solid member, the parts including this solid member were dipped into hot water at 80° C. and gradually cooled, and, when the core member 34 was a hollow member, cooling water at 25° C. was flowed through the hollow portion of this hollow member.

After the cooling step, the film was removed from the columnar member and the tubular molding member and found to have a film thickness of 80±8 μm.

Seventh Embodiment

Figure 22:
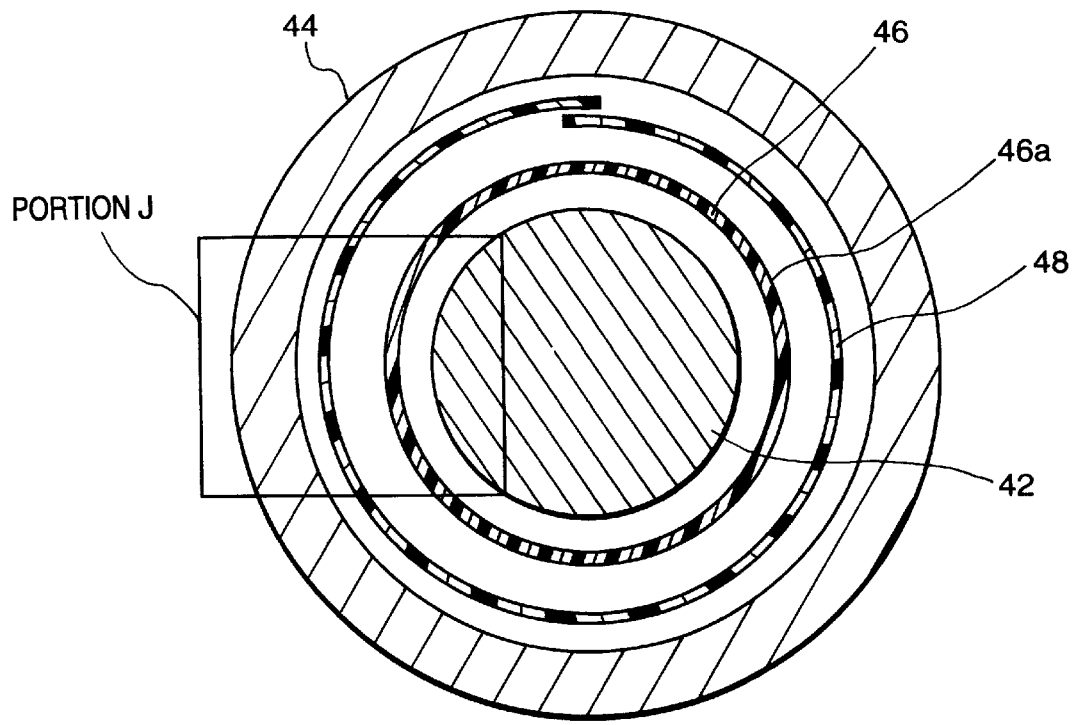
FIG. 22 is a view for explaining the seventh embodiment of the present invention.

FIG. 22 shows this embodiment. Reference numeral 42 denotes a columnar member made from a polytetrafluoroethylene resin; and 44, a molding member manufactured by shaping the stainless steel described previously into a tube. The outer diameter of the columnar member 42 and the inner diameter of the tubular molding member 44 were so designed that the gap between the two members was 128 μm when they were heated at 290° C. for 30 min.

A tubular first film 46 was made from a non-thermoplastic resin material, e.g., a condensed polyimide resin. A 4-μm thick fluorine resin film 46a containing a polyamidoimide resin as a binder was coated on the outer surface of the tubular film. The thickness of the tubular film 46 was 50 μm. A sheet film 48 was formed by cutting a 10-μm thick thermoplastic PFA resin into a predetermined size. The outer circumferential surface of the columnar member 42 was covered with the tubular film 46, and the sheet film was so wound that the two ends of the film overlapped each other with a predetermined width. Furthermore, the tubular molding member 44 was fitted on the film.

The resultant structure was placed in a heating oven and heated at a temperature of 290° C. for 30 min. In this heating step, the columnar member 42 and the tubular molding member 44 expanded as the temperature rose, and the gap between them was narrowed by the difference between their thermal expansion coefficients. The tubular film 46 and the sheet film 48 were heated at this heating temperature. As a result, the thermoplastic sheet film was softened by heating, and the overlapping portions at the two ends of the film were welded and connected due to compression resulting from the decrease in the gap between the columnar member and the tubular molding member. The sheet film 48 thus formed a tubular film because its two ends were connected, and the tubular film 46 and the sheet film 48 in the form of a tubular film adhered to each other due to narrowing of the gap described above. The result was a two-layered tubular film in which two layers were adhered via the resin film coated on the tubular film 46.

After the predetermined heating time elapsed, the columnar member and the tubular molding member were removed from the heating oven and cooled. When the columnar member 42 and the tubular molding member 44 were cooled to a predetermined temperature, the film was pulled out from these members, thereby completing the two-layered tubular film. In this embodiment, it was possible to well remove the molded film from the columnar member 42 since the fluorine resin releasing agent was coated on the inner surface of the tubular film 46.

Eighth Embodiment

Figure 23:
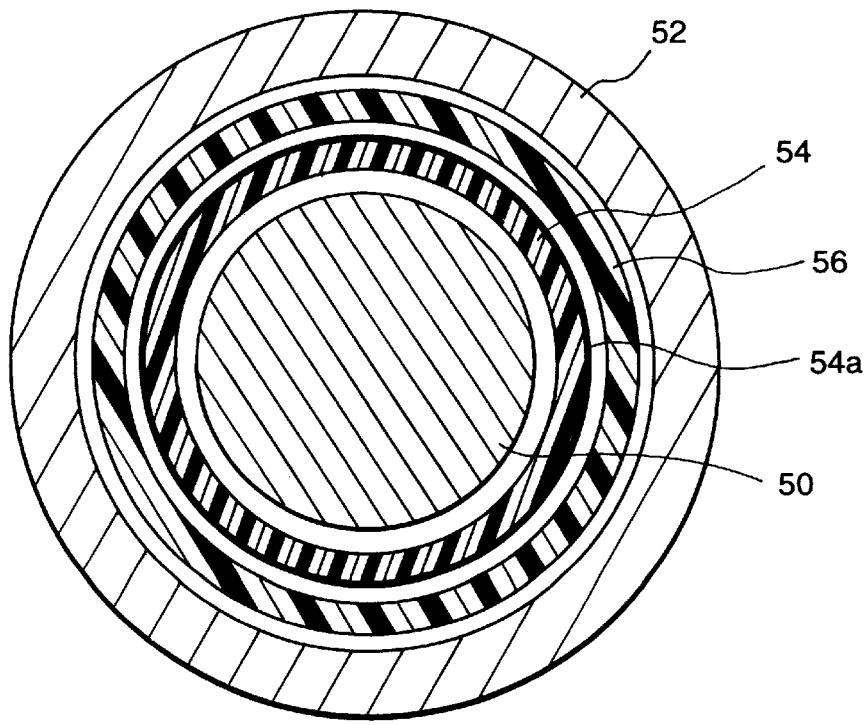
FIG. 23 is a view for explaining the eighth embodiment of the present invention.

This embodiment proposes a method of manufacturing a multilayered tubular film by using a plurality of tubular (tube-like, ring-like) films. FIG. 23 shows this embodiment. In FIG. 23, reference numeral 50 denotes a columnar member made from a polytetrafluoroethylene resin; and 52, a tubular molding member made from the aluminum material described earlier. The thermal expansion coefficients of the columnar member 50 and the tubular molding member 52 were $10.0 \times 10^{-5}$ and $2.4 \times 10^{-5}$ (/°C.), respectively.

The difference between the outer diameter of the columnar member 50 and the inner diameter of the tubular molding member 52 were so designed as to be 160 μm when the two members were heated at a temperature of 290° C. A first tubular film 54 was made of a 50-μm thick non-thermoplastic condensed polyimide resin film.

A 10-μm thick fluorine resin primer 54a containing a polyamidoimide resin as a binder was coated on the outer surface of the first tubular film 54. In this embodiment, the condensed polyimide resin film and the PFA resin film bind only weakly because only an intermolecular force bond exists between them if there is no primer. The use of the primer can strengthen the bond of the films.

A second tubular film 56 was manufactured from a 20-μm thick thermoplastic PFA resin film in accordance with the method described in the first embodiment.

The method of this embodiment will be described below. The columnar member 50 was covered with the first tubular film 54, and the second tubular film 56 was fitted on the film 54. These columnar member and films were then fitted in the tubular molding member 52. The resultant structure was placed in a heating oven and heated at a temperature of 290° C. for 30 min. In this heating step, the columnar member 50 and the tubular molding member 52 expanded as the temperature rose. The gap between these members was decreased with temperature rise due to the difference between the thermal expansion coefficients of the members.

The temperatures of first and second tubular films rose upon heating. The first tubular film did not soften with heat because the film was non-thermoplastic. However, the second tubular film softened with temperature rise because the film was made from a thermoplastic resin material. While the temperature rose, the first and second tubular films welded together via the primer 54a due to the softening of the second tubular film, the adhesion of the primer, and the decrease in the gap between the columnar member and the tubular molding member. Thereafter, the resultant structure was removed from the heating oven, and the film was released from the columnar member and the tubular molding member. The result was a 80-μm thick tubular film in which the first and second tubular films were connected.

In this embodiment, the film to be inserted between the columnar member and the tubular molding member was not a sheet film but a tubular film having no overlapping end portions. Since one of the films was softened by heating it and pressed against the inner circumferential surface of the tubular molding member, it was possible to uniformize the thickness of the overall film.

Ninth Embodiment

Explanation of ninth embodiment (embodiment using split mold)

This embodiment provides a tubular film further improved in the releasability and a method of manufacturing the film.

Figure 25:
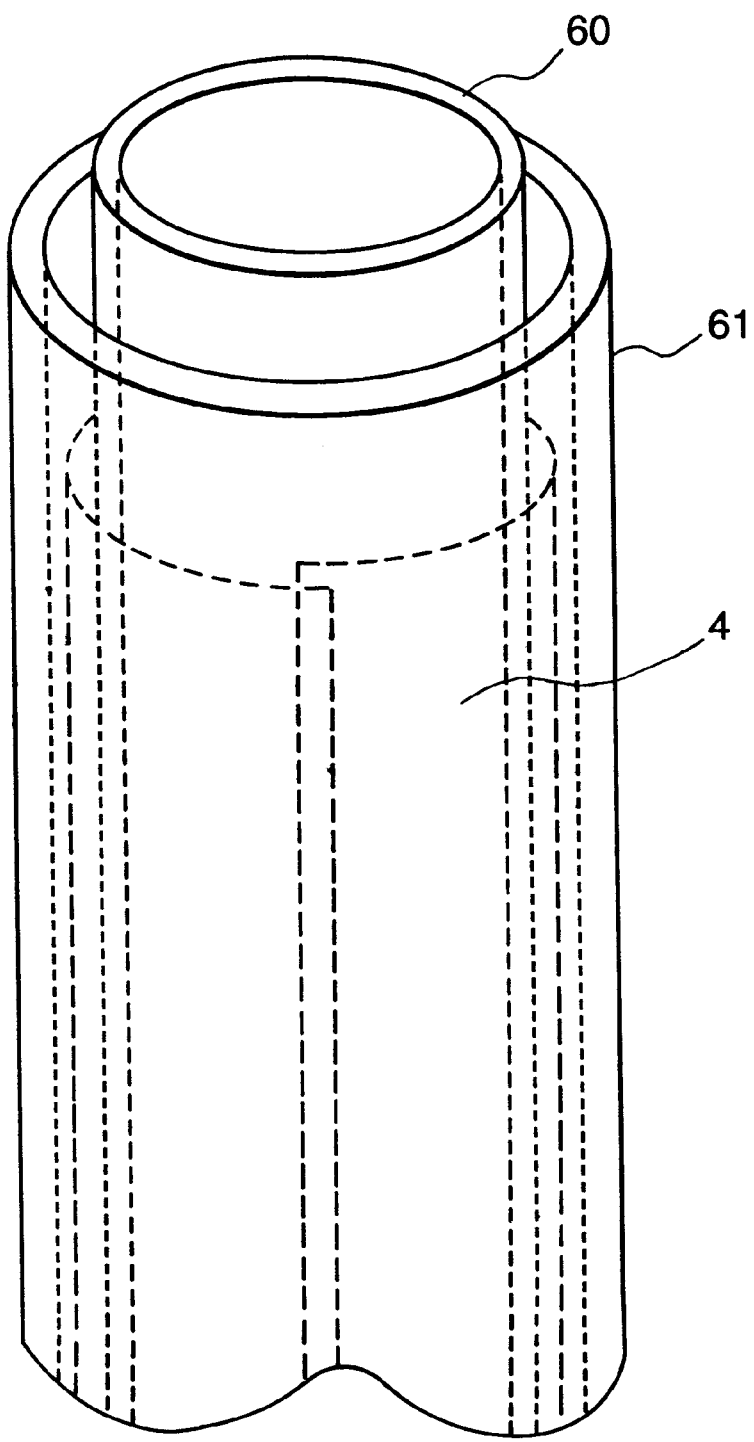
FIG. 25 is a view for explaining still another embodiment of the present invention.
Figure 26:
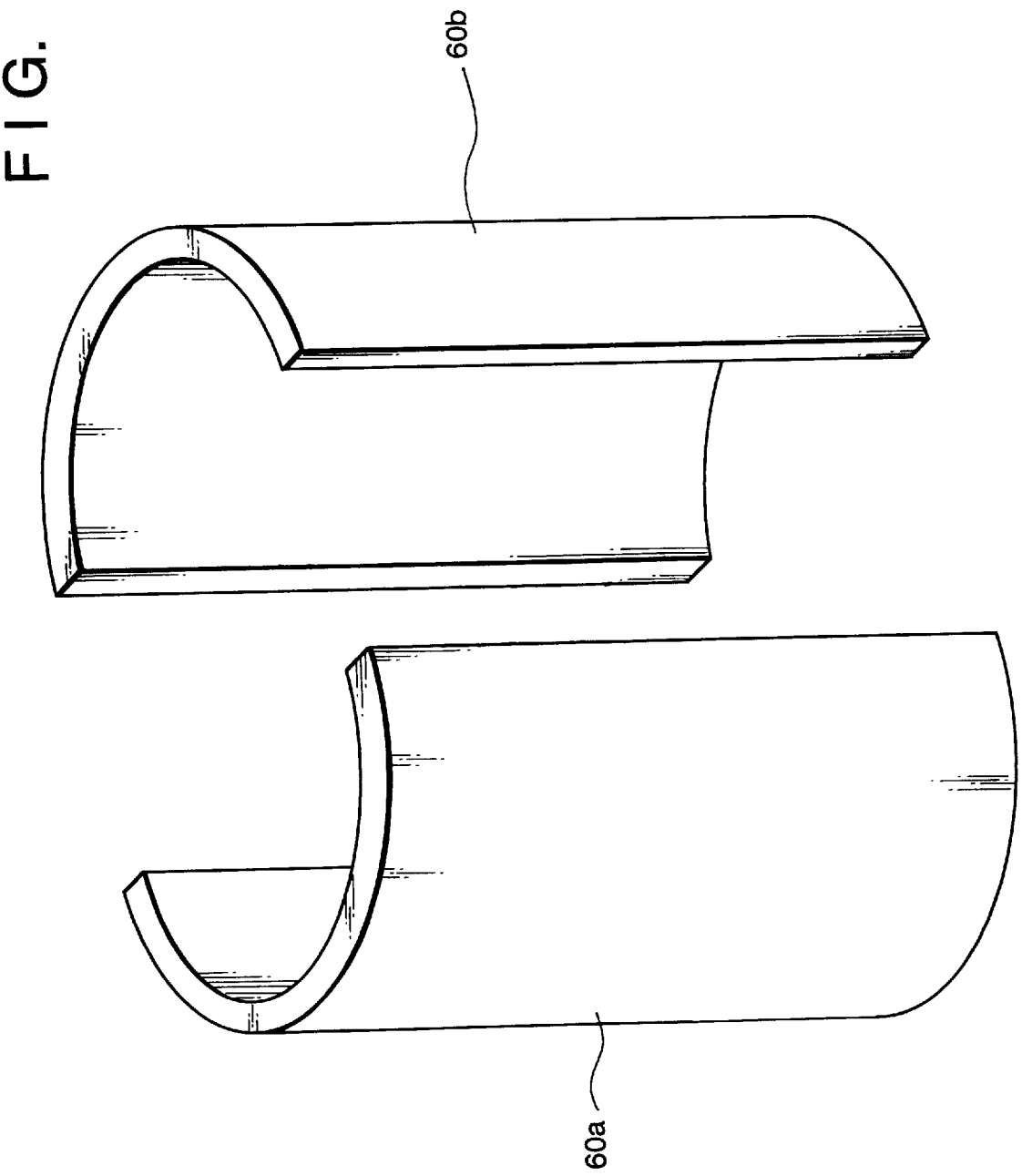
FIG. 26 is a view for explaining still another embodiment of the present invention.

FIGS. 25 and 26 illustrate this embodiment.

As in FIG. 26, a hollow columnar member 60 made from an aluminum material consists of two parts 60a and 60b. Note that the thermal expansion coefficient of the member 60 was the same as that in the first embodiment.

A tubular molding member 61 was made from stainless steel and had the same thermal expansion coefficient as in the first embodiment. The parts 60a and 60b can have any shapes provided that they combine into a columnar member, so their shapes are not limited to those of this embodiment.

As a sheet film, a 50-μm thick polyetheretherketone film cut into the same dimensions as in the first embodiment was used.

The outer diameter of the columnar member 60 and the inner diameter of the tubular molding member 61 were so designed that the gap between the two members was 100 μm when they were at a temperature of 370° C.

The sheet film was wound on the outer circumferential surface of the columnar member 60 so that the leading and the trailing ends of the film overlapped each other. The wound sheet film was covered with the tubular molding member 61, and the resultant structure was placed in a heating oven.

In the heating oven heating was performed at 370° C. for 30 min. By this heating in the heating oven, the columnar member and the tubular molding member thermally expanded, and the film softened. The gap between the columnar member and the tubular molding member was narrowed by the difference between their thermal expansion coefficients. Due to this narrowing of the gap, softening of the film, and compression between the columnar member and the tubular molding member, the film was welded and the film thickness was uniformized.

After the above heating time elapsed, the tubular member, the film, and the columnar member were removed from the heating oven and cooled. Cooling was done by flowing cooling water at 25° C. into the hollow columnar member 60 at a flow rate of 0.1 (l/s). At a predetermined temperature of 40° C., the tubular molding member was first removed, one part (60a) of the columnar member was removed, and finally the tubular, cylindrical film was pulled out.

In this embodiment, the columnar member was separated into two parts, and this further facilitated release of the film from the columnar member.

Tenth Embodiment

Explanation of tenth embodiment (embodiment using spiral winding)

Figure 27:
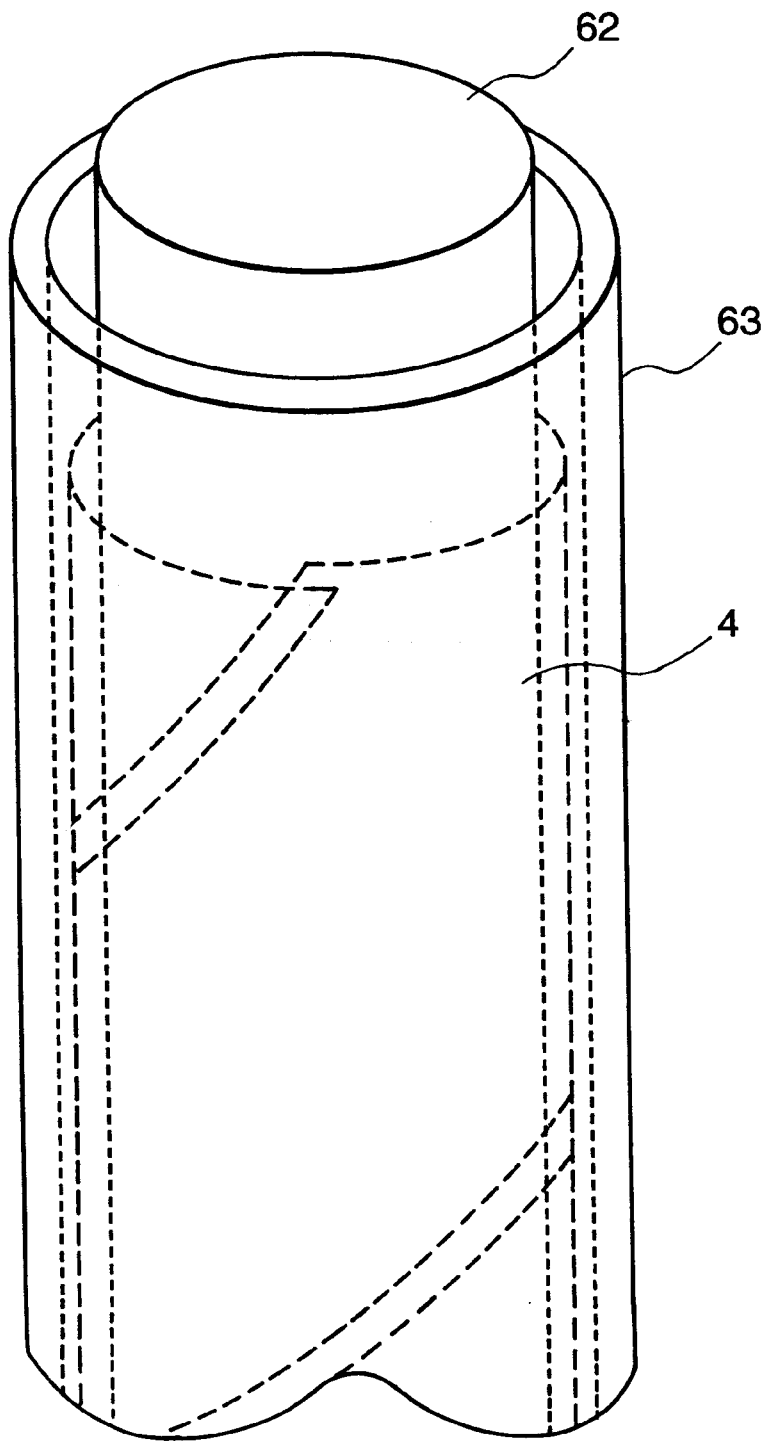
FIG. 27 is a view for explaining still another embodiment of the present invention.

This embodiment provides a method of manufacturing a tubular film required to have a more precise uniformity in thickness. FIG. 27 shows this embodiment. In FIG. 27, reference numeral 62 denotes an aluminum columnar member; and 63, a stainless-steel tubular molding member. The thermal expansion coefficients of the columnar member and the tubular molding member were the same as those in the first embodiment. The difference between the outer diameter of the columnar member and the inner diameter of the tubular molding member were so designed as to be 100 μm when the two members were heated at a temperature of 370° C.

A polyetheretherketone sheet film cut into the same dimensions as in the first embodiment was wound on the outer circumferential surface of the columnar member 63, so that the two ends of the film overlapped each other and the overlapping portions were spirally formed on the columnar member. The wound sheet film was covered with the tubular molding member 63, and the resultant structure was placed in a heating oven. By heating in the heating oven, the columnar member and the tubular molding member expanded, and the film softened. The gap between the columnar member and the tubular molding member was narrowed by the difference between the thermal expansion coefficients of these members. Due to this narrowing of the gap, softening of the film, and compression between the columnar member and the tubular molding member, the film was welded and the film thickness was uniformized. After the heating time elapsed, the tubular member, the film, and the columnar member were removed from the heating oven and cooled. When a predetermined cooling temperature of 40° C. was reached, the tubular molding member was removed, and then the tubular, cylindrical film was pulled out from the columnar member.

When the overlapping portion is linearly arranged as in the first embodiment, a pressure resulting from thermal expansion of the columnar member strongly acts on the overlapping portions. As a consequence, the columnar member is decentered by the counterforce to the side away from the overlapping portion of the film. The result is that a variation to some extent occurs in the film thickness of the formed tubular film.

In this embodiment, however, the overlapping portions were spirally formed to thereby prevent decentering of the columnar member. This made it possible to obtain a tubular film having a more precise uniformity in the film thickness.

The thickness of the tubular film obtained by this embodiment was found to be 50±3 μm throughout the film.

Eleventh Embodiment

FIGS. 30 to 38 illustrate the eleventh embodiment of the present invention.

Reference numeral 71 denotes a columnar member as a core on which a film 74 is wound. In this embodiment a solid bar is used as the columnar member 71. A tubular or hollow molding member 72 has an inner diameter which allows insertion of the columnar member 71. In this embodiment, an aluminum material is used as the columnar member, and stainless steel is used as the tubular molding member. It is preferable that the thermal expansion coefficient of the material of the columnar member 71 be larger than that of the material of the tubular molding member 72.

This embodiment will be described in detail below.

The dimensions of the sheet film were chosen in accordance with the inner diameter of a tubular film to be manufactured, and the sizes of the columnar member 71 and the tubular molding member 72 were selected in accordance with the chosen dimensions. As the sheet film 74, a cut sheet 75.4 mm long and 300 mm wide made from a thermoplastic material, in this embodiment polyetheretherketone (PEEK), was prepared. The film thickness of this sheet film was 50 μm.

The columnar member was made from aluminum with a thermal expansion coefficient of $2.4 \times 10^{-5}$ (/°C.), and the tubular molding member was made from stainless steel with a thermal expansion coefficient of $1.5 \times 10^{-5}$ (/°C.). The diameter and the length of the columnar member were 24.0 mm and 330 mm, respectively. The inner diameter, the outer diameter, and the length of the tubular molding member were 24.2 mm, 30.0 mm, and 330 mm, respectively. The dimensions of the columnar member 71 and the tubular molding member 72 were so designed that the difference between the outer diameter of the columnar member 71 and the inner diameter of the tubular molding member 72 was 100 μm when the temperature was 370° C. during heating in a heating step (to be described later).

Figure 30:
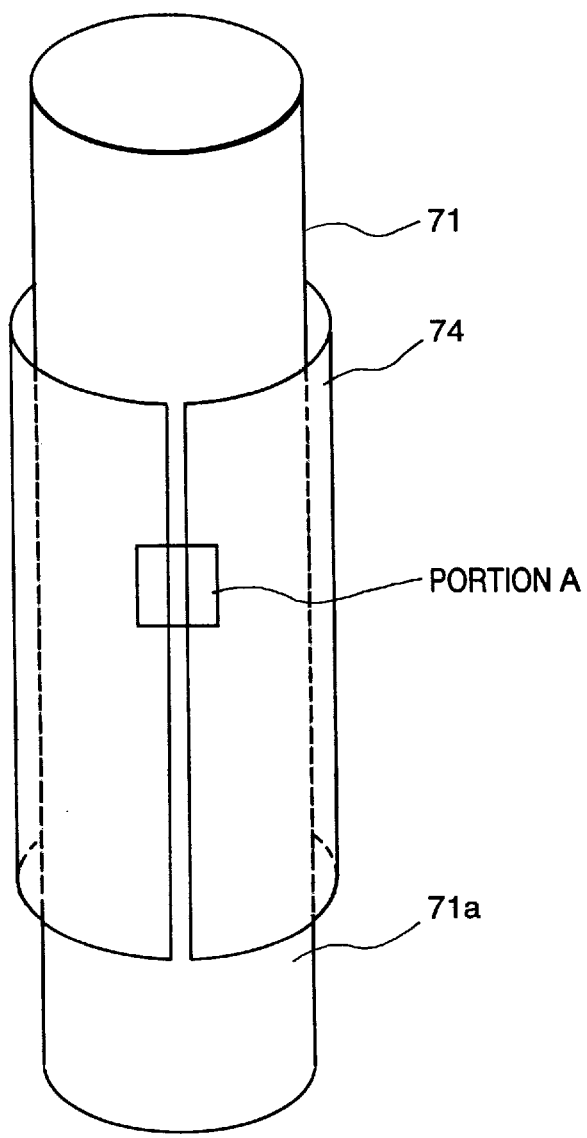
FIG. 30 is a view for explaining the state in which a sheet film is wound on a columnar member in the direction of section.
Figure 31:
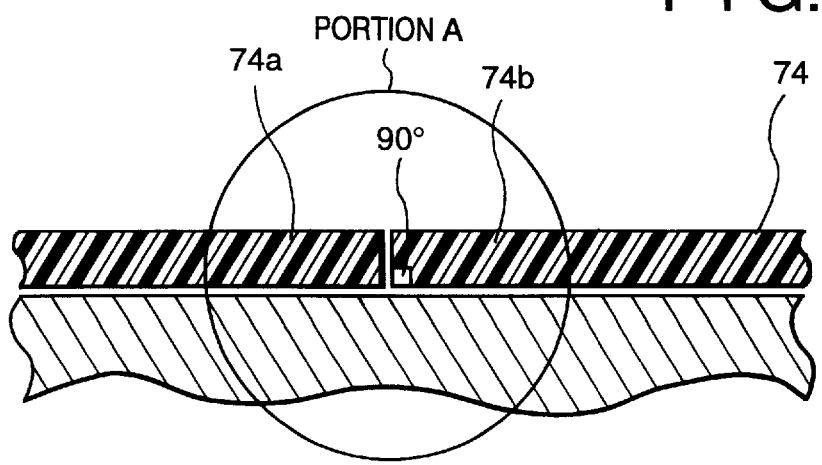
FIG. 31 is a view for explaining the way the two end portions of the film wound on the outer circumferential surface of the columnar member butt against each other.

As illustrated in FIG. 30, the sheet film 74 prepared as described above was wound on an outer circumferential surface 71*a* of the columnar member 71 so that the two ends of the film butted in a portion A as in FIG. 31. In this case the angle which each butted end face formed with the sheet film surface was 90° as in FIG. 31.

Figure 33:
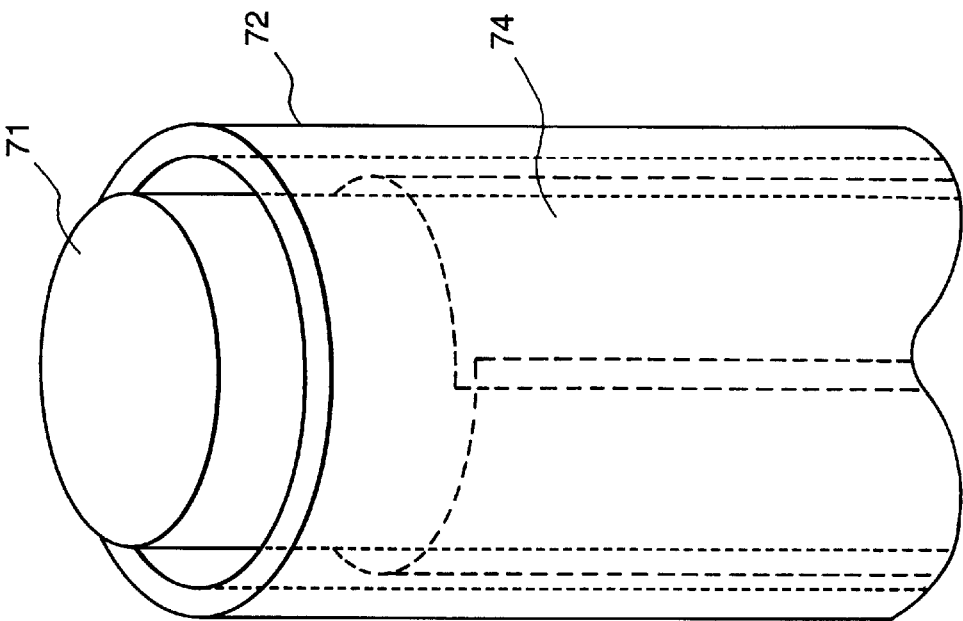
FIG. 33 is a view for explaining the state in which a sheet film wound on a columnar member is covered with a tubular molding member.
Figure 32:
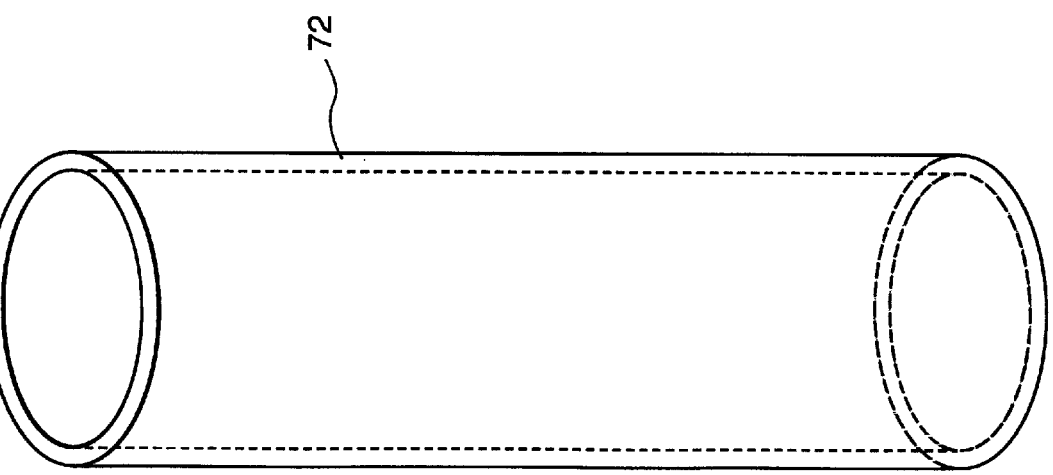
FIG. 32 is a view of a tubular molding member.

Subsequently, as illustrated in FIG. 33, the columnar member 71 on which the film 74 was wound was inserted into the hollow portion of the tubular molding member 72. The columnar member 71, the film 74, and the tubular molding member 72 were placed in the heating oven 60, FIG. 5, and heated.

The heading conditions in the heating oven 60 were that the heating temperature was 370±5° C. and the heating time was 30±1 min. This heating time was determined by taking account of the melt temperature of the film material and the heat deterioration of the film.

Figure 34:
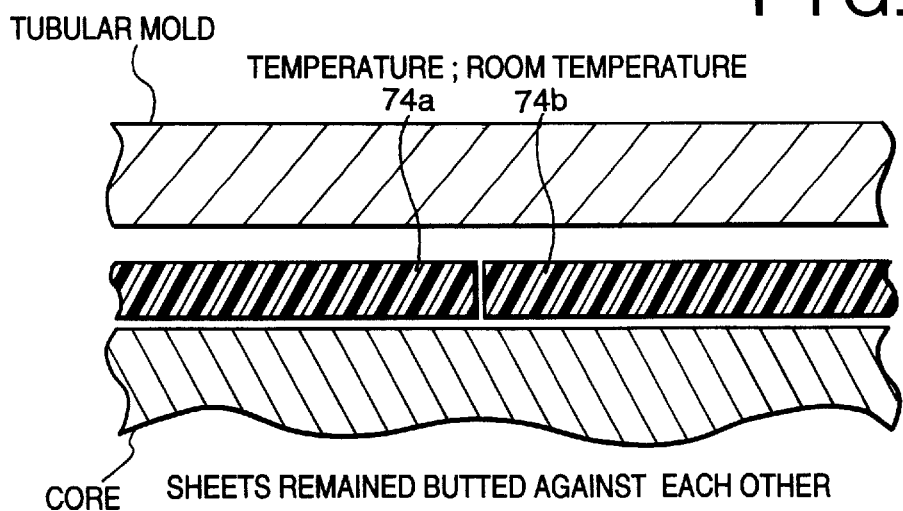
FIG. 34 is a view for explaining the way a sheet film is wound.
Figure 35:
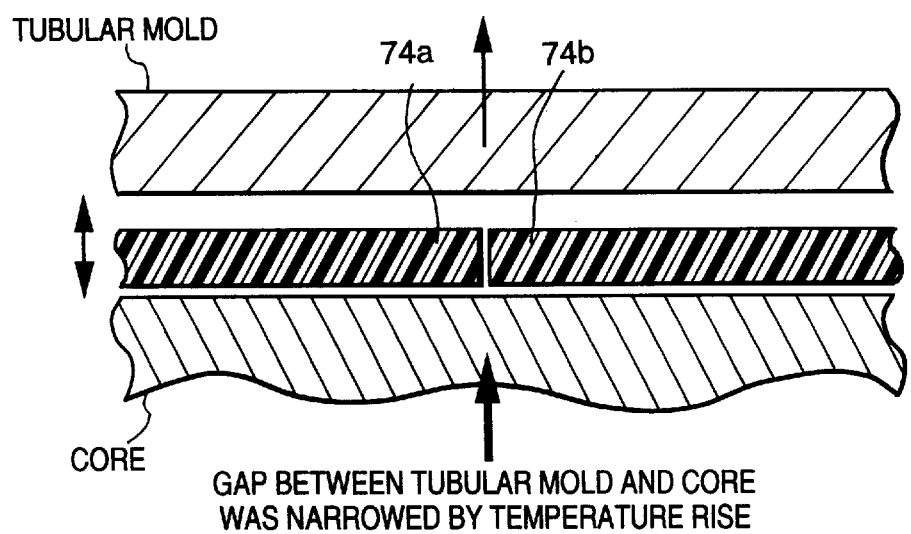
FIG. 35 is a view for explaining the state of a film between a columnar member and a tubular molding member.
Figure 36:
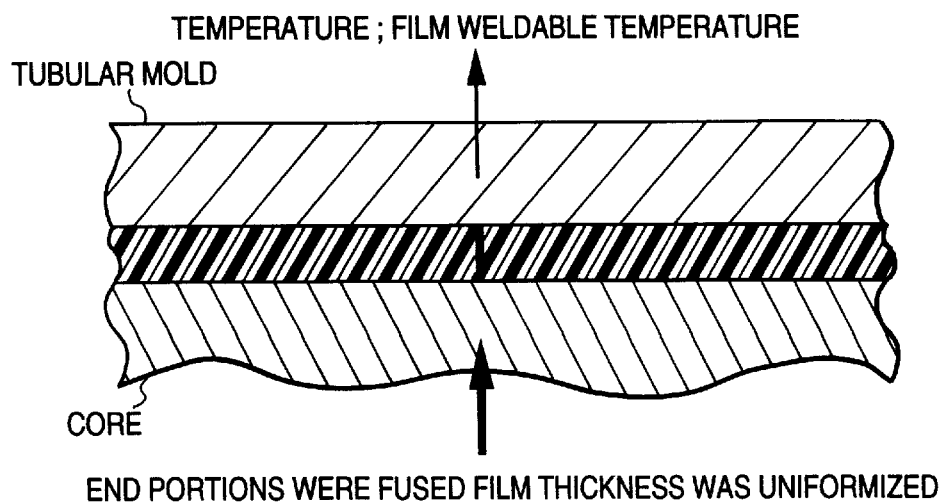
FIG. 36 is a view for explaining the state of heating.

During the heating step in the heating oven 60, the columnar member 71, the tubular molding member 72, and the film 74 changed as shown in FIGS. 34 to 36. First, the film 74 placed in the heating oven 60 was wound in the gap between the columnar member 71, as a core, and the tubular molding member 72, and two ends 74*a* and 74*b* formed butted portions. The dimensional gap between the outer diameter of the columnar member 71 and the inner diameter of the tubular molding member 72 was 200 μm. The columnar member 71, the film 74, and the tubular molding member 72 were heated from this state, and the temperatures of these members rose. The columnar member 71 and the tubular molding member 72 began expanding in accordance with the respective thermal expansion coefficients (FIG. 34). The film 74 started softening as the temperature rose, and the columnar member 71 and the tubular molding member 72 started expanding with the temperature rise. Since, however, the thermal expansion coefficient of the aluminum material of the columnar member 71 was larger than the thermal expansion coefficient of the tubular molding member 72, the dimensional gap between the outer diameter of the columnar member 71 and the inner diameter of the tubular molding member 72 was narrowed from that in the initial low-temperature state (FIG. 35).

Figure 37:
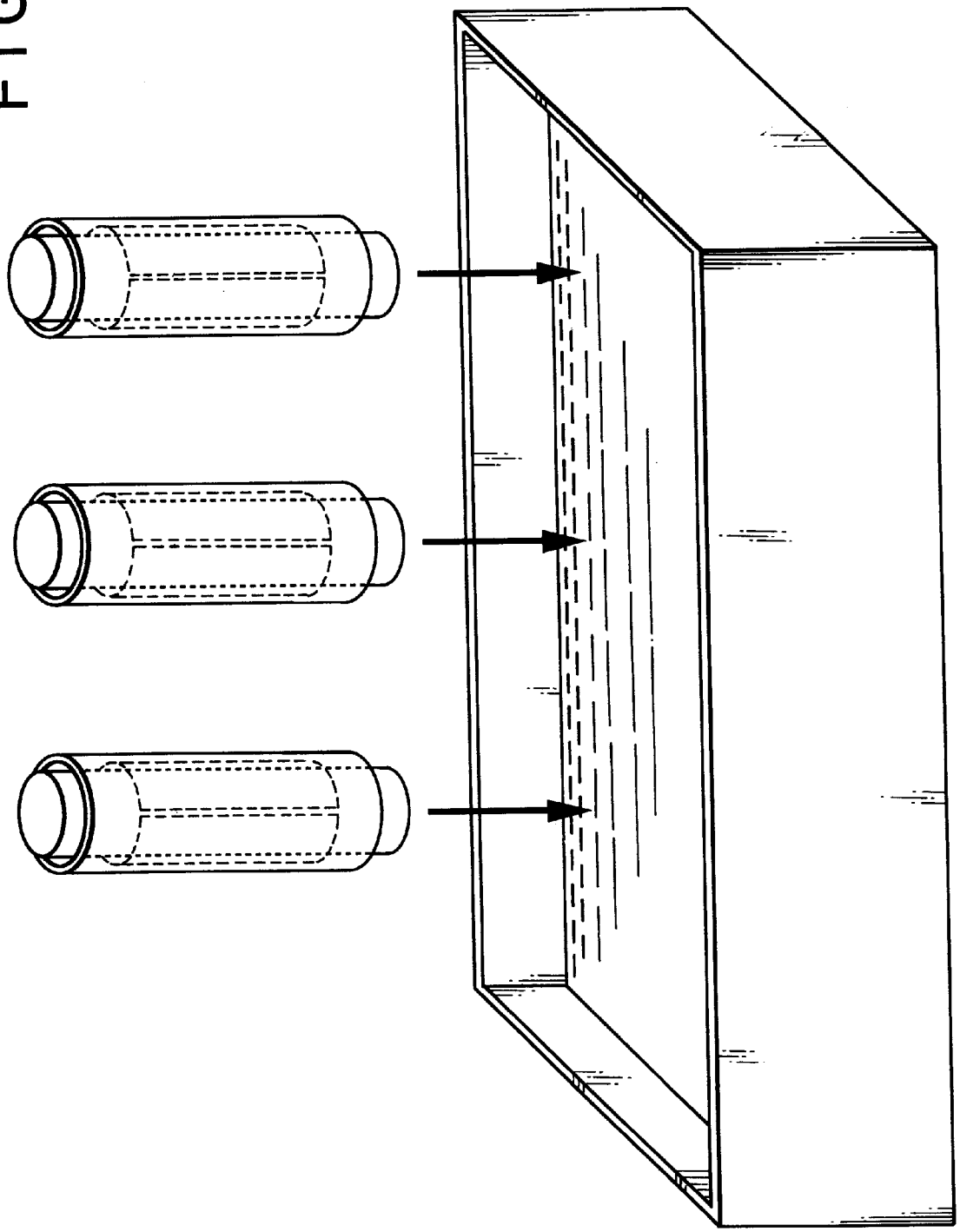
FIG. 37 is a view for explaining the state of cooling.

As the gap between the columnar member 71 and the tubular molding member 72 was narrowed, the film 74 sandwiched between them softened more. The butted portions of the two ends 74*a* and 74*b* of the film were welded and connected. Note that the gap between the columnar member and the tubular molding member finally became the same as a desired film thickness to thereby uniformize the film thickness throughout the entire circumference (FIG. 36). When the heating time of 30 min described above elapsed, heating was stopped, and a cooling step was started (FIG. 37).

During cooling done in this cooling step, the columnar member 71, the film 74, and the tubular molding member 72 can be naturally cooled after heating in the heating step is stopped. However, rapid cooling also can be performed to shorten the cooling time. In this embodiment, after being heated the individual members were dipped into a coolant in a liquid bath and cooled at a cooling rate of 350° C./min. After the cooling temperature became almost room temperature, the film was removed from between the columnar member and the tubular molding member. The result was that the removed film was finished into a tubular (cylindrical) shape and the butted portions 74*a* and 74*b* of the original sheet film were well connected. Also, the film thickness was as uniform as approximately 50 μm±3 μm (±6%) throughout the tubular film.

The tubular film manufactured by the above method was used in the fixing device of the image forming apparatus shown in FIG. 10. In the fixing film according to the present invention, the film thickness had a high uniformity, and the thickness of the butted portion of the sheet film was equal to the thickness of the rest of the film. Accordingly, heat was uniformly conducted from the film to toner, resulting in a very high image quality.

Note that as the film material and the mold material usable in this embodiment, those enumerated in the first embodiment can be preferably used.

Note also that the butted portions 74*a* and 74*b* of the sheet film can be spirally arranged as in the tenth embodiment. In this case it is possible to further improve the uniformity of the thickness of the tubular film.

Twelfth Embodiment

FIGS. 38 to 41 illustrate the twelfth embodiment of the present invention.

Figure 38:
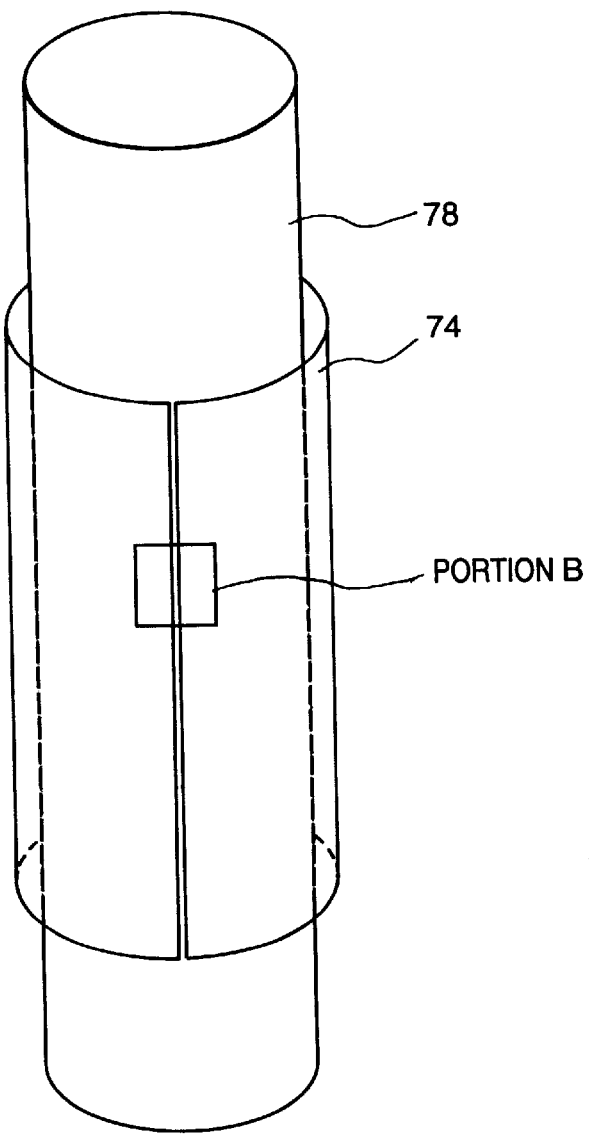
FIG. 38 is a view for explaining the twelfth embodiment of the present invention.

The characteristic feature of this embodiment is that the connection strength of a welded portion is further increased. In FIG. 38, reference numeral 78 denotes an aluminum columnar member; and 80, a stainless-steel tubular molding member. The thermal expansion coefficients and the dimensions of the columnar member 78 and the tubular molding member 80 were the same as in the eleventh embodiment described above.

Figure 39:
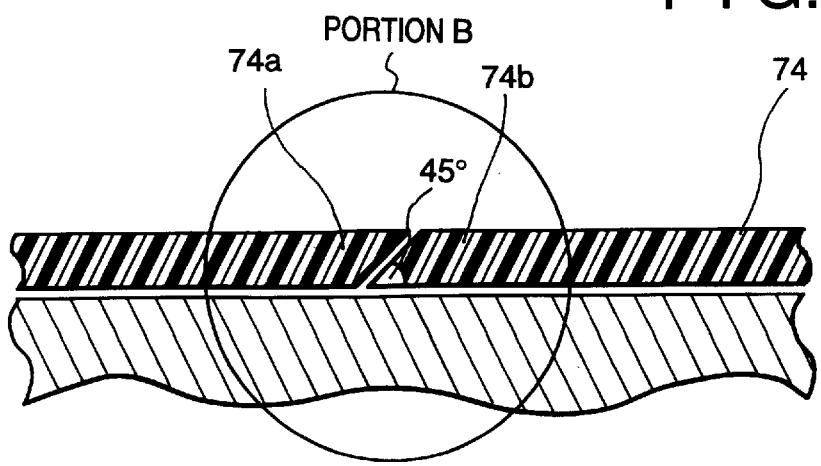
FIG. 39 is a view for explaining the twelfth embodiment of the present invention.
Figure 40:
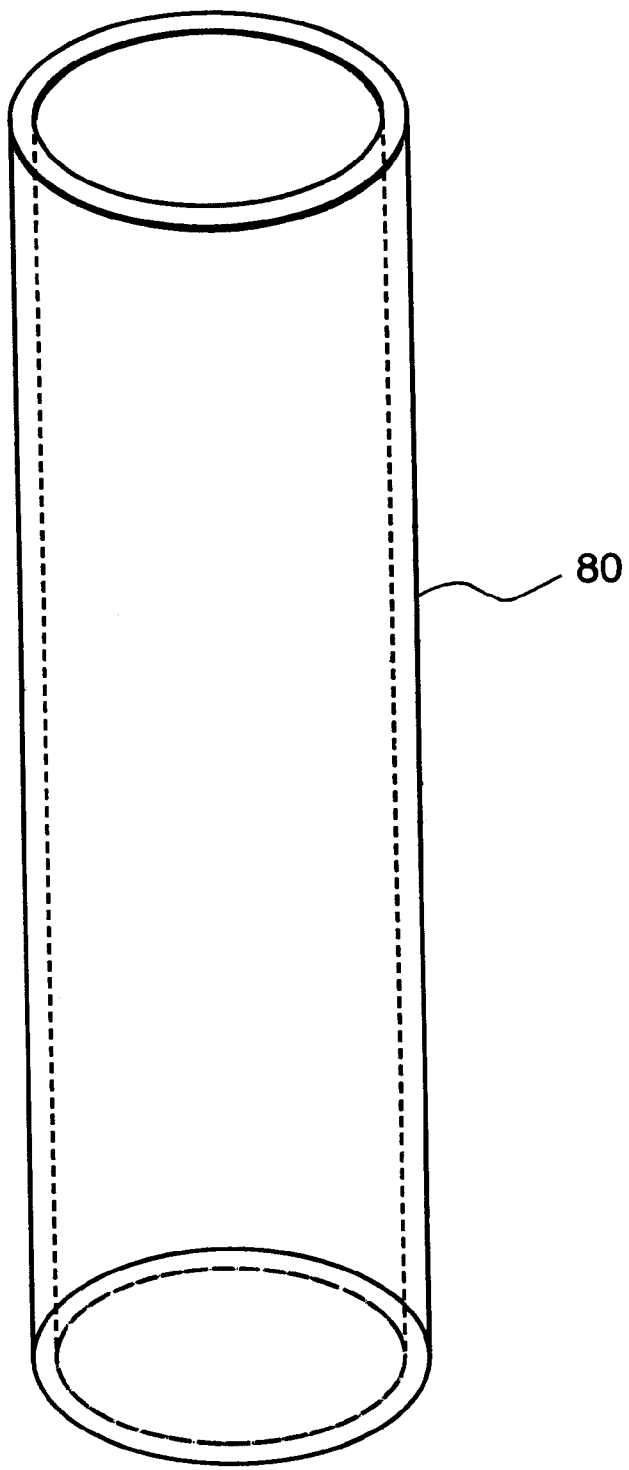
FIG. 40 is a view for explaining the twelfth embodiment of the present invention.

A PEEK sheet film cut into the same dimensions as in the eleventh embodiment was wound on the outer circumferential surface of the columnar member 78 so that the two ends of the film butted against each other. As illustrated in FIG. 39, in a portion B the angle which the butted end faces formed with the sheet film surface was 45°. The film 74 wound on the columnar member 78 was covered with the tubular molding member 80, and the resultant structure was placed in the heating oven illustrated in FIG. 28. In the heating oven heating was performed at 370° C. for 30 min.

By heating in this heating oven, the columnar member and the tubular molding member expanded, and the film softened. The gap between the columnar member and the tubular molding member was narrowed by the difference between the thermal expansion coefficients of these members. Due to this narrowing of the gap, softening of the film, compression between the columnar member and the tubular molding member, the film was welded and the film thickness was uniformized.

After the heating time described above elapsed, the resultant structure was removed from the heating oven and cooled at a cooling rate of 350° C./min. When one minute elapsed from the start of cooling, the film was removed from the columnar member and the tubular molding member. Consequently, it was possible to well separate the film from these members.

A tensile strength test was performed for the connected portion of the film manufactured by this embodiment and the connected portion of the film manufactured by the eleventh embodiment. The results were as shown in FIG. 41. As in FIG. 41, the strength of the connected portion was improved by approximately 13%.

Note that the butted portions 74a and 74b of the sheet film can also be spirally arranged as in the tenth embodiment. In this case it is possible to further improve the uniformity of the thickness of the tubular film.

Thirteenth Embodiment

FIGS. 42 to 47 illustrate the thirteenth embodiment of the present invention.

Fixing films for use in image forming apparatuses are required to have various film thicknesses as already described above. Therefore, this embodiment proposes a tubular film whose film thickness can be arbitrarily set, and a method of manufacturing the film.

Figure 42:
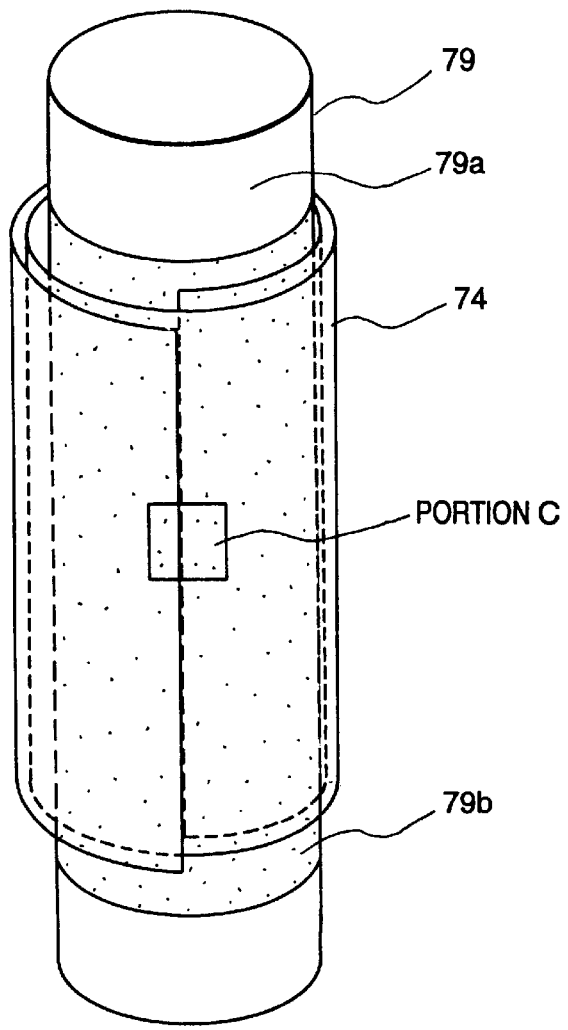
FIG. 42 is a view showing the thirteenth embodiment of the present invention.
Figure 43:
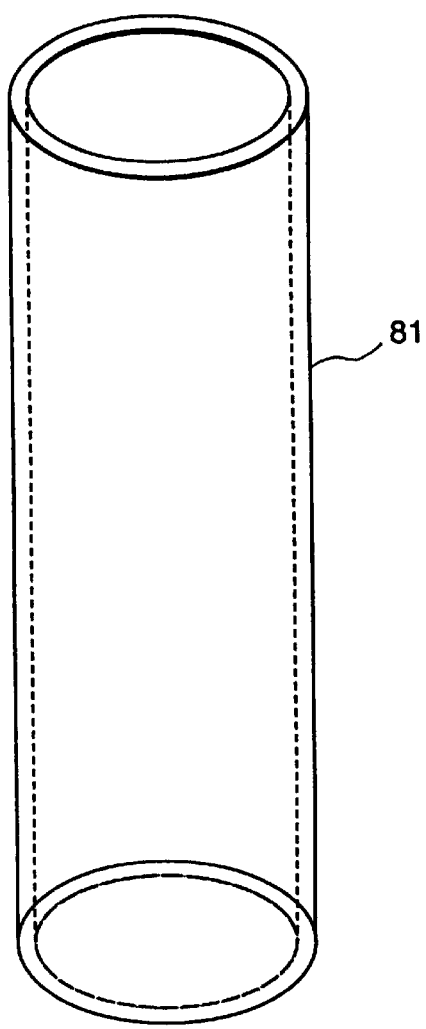
FIG. 43 is a view showing the thirteenth embodiment of the present invention.
Figure 44:
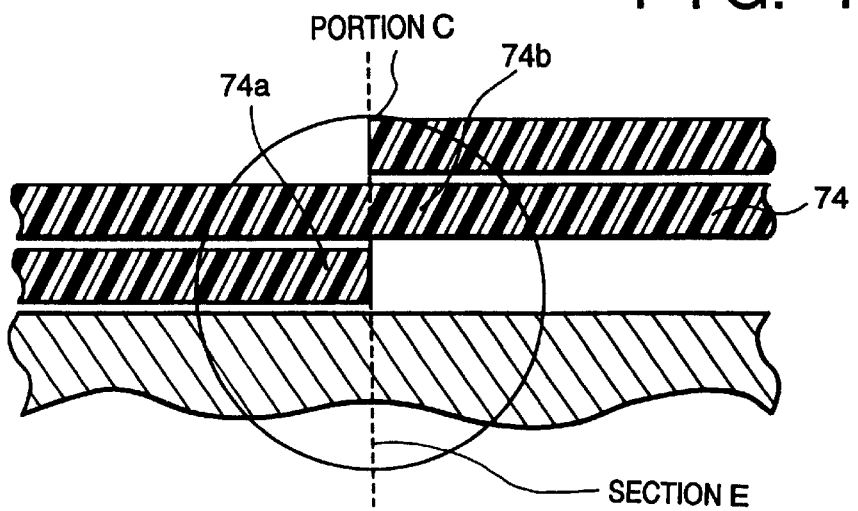
FIG. 44 is a view showing the thirteenth embodiment of the present invention.

In FIG. 42, reference numeral 79 denotes a columnar member manufactured by coating a chemical nickel plating film 79b on the outer circumferential surface of an aluminum columnar member. In FIG. 43, reference numeral 81 denotes a tubular molding member made from the stainless steel described above. Referring to FIG. 42, a 50-$\mu$m thick PEEK film 74 was wound double on the outer circumferential surface of the columnar member 79a (79b). As shown in FIG. 44, the sheet film 74 was wound such that the leading and the trailing ends of the film butted against each other in a certain section E (portion C). The film 74 wound on the columnar member 79 was covered with the tubular molding member 81, and the resultant structure was placed in the heating oven shown in FIG. 28. In this heating oven heating was performed at 370° C. for 30 min.

During heating done in the heating oven, the portion C of the film 47 changed as illustrated in FIGS. 45 to 47. First, the film 74 placed in the heating oven 60 was wound in the gap between the columnar member 79, as a core, and the tubular molding member 81, and two ends 74a and 74b formed butted portions. The dimensional gap between the outer diameter of the columnar member 79 and the inner diameter of the tubular molding member 81 was 400 $\mu$m. The columnar member 79, the film 74, and the tubular molding member 81 were heated from this state, and the temperatures of these members rose. The columnar member 79 and the tubular molding member 81 began expanding in accordance with the respective thermal expansion coefficients (FIG. 45). The film 74 started softening as the temperature rose, and the columnar member 79 and the tubular molding member 81 started expanding with the temperature rise. Since, however, the thermal expansion coefficient of the aluminum material of the columnar member 79 was larger than the thermal expansion coefficient of the tubular molding member 81, the dimensional gap between the outer diameter of the columnar member 79 and the inner diameter of the tubular molding member 81 was narrowed from that in the initial low-temperature state (FIG. 46). As the gap between the columnar member 79 and the tubular molding member 81 was narrowed, the film 74 sandwiched between them softened more. The butted portions of the two ends 74a and 74b of the film were welded and connected. Note that the gap between the columnar member and the tubular molding member finally became the same as a desired film thickness to thereby uniformize the film thickness throughout the entire circumference (FIG. 47).

When the heating time described above elapsed, the resultant structure was removed from the heating oven and cooled at a cooling rate of 350° C./min. When one minute elapsed from the start of cooling, the film was removed from the columnar member and the tubular molding member. The result was that a tubular film with a film thickness of 100±6 $\mu$m was obtained.

Fourteenth Embodiment

Figure 48:
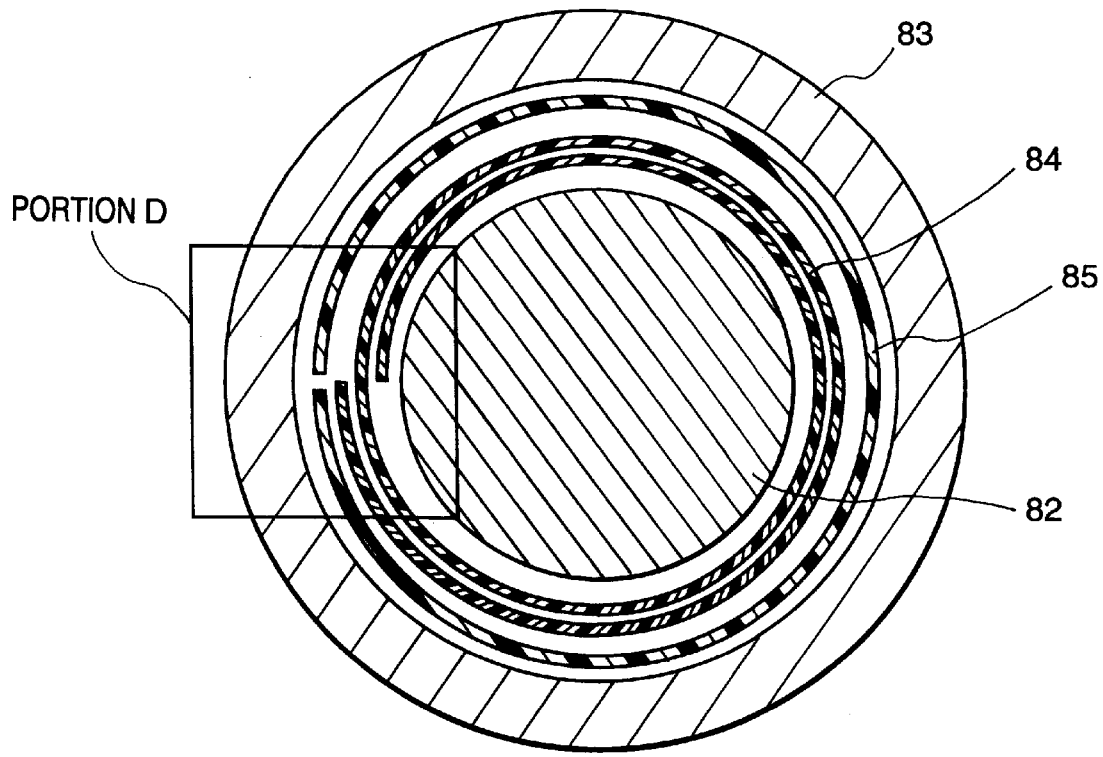
FIG. 48 is a view showing the fourteenth embodiment of the present invention.
Figure 49:
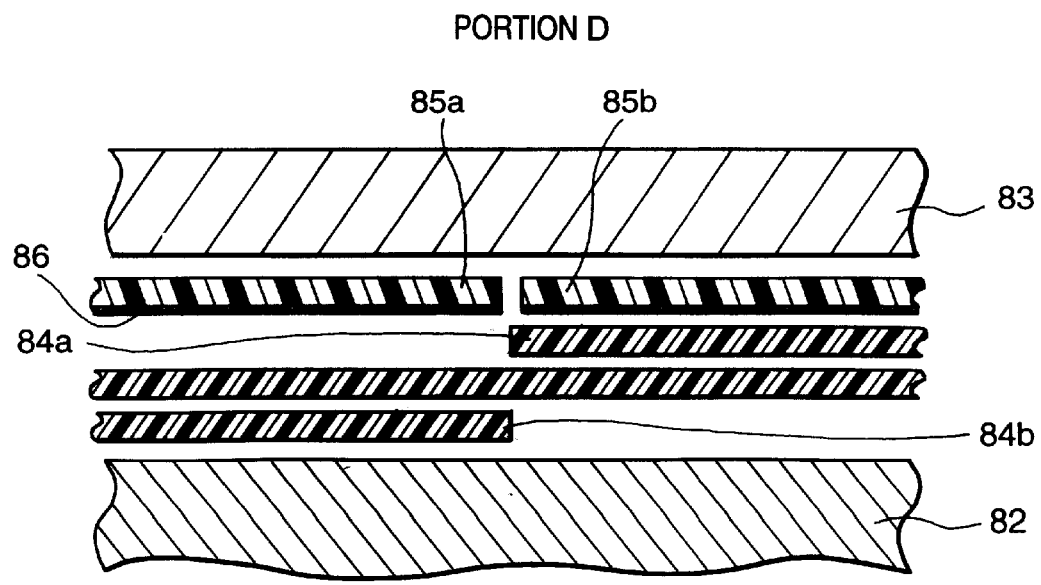
FIG. 49 is a view showing the fourteenth embodiment of the present invention.

FIGS. 48 and 49 show the fourteenth embodiment of the present invention.

This embodiment relates to a method and an apparatus for obtaining a multilayered tubular film. In each of the above eleventh to thirteenth embodiments, a tubular film is manufactured from a single sheet film. In this embodiment, a tubular film is formed from a plurality of sheet films. A fixing film for use in an image forming apparatus, in which the tubular film of the present invention is significantly effective and which is one object of development by the present invention, is required to consist of two or more tubular films when a toner offset phenomenon is taken into consideration. This is because the use of a fluorine-based resin as the outermost layer is effective in controlling the offset phenomenon. Therefore, this embodiment proposes a tubular film consisting of a plurality of layers different in thickness and a method of manufacturing the tubular film.

In FIG. 48, reference numeral 82 denotes a columnar member made from a polytetrafluoroethylene resin; and 83, a tubular molding member made from the aluminum material described above. The thermal expansion coefficients of the columnar member 82 and the tubular molding member 83 were $10.0 \times 10^{-5}$ and $2.4 \times 10^{-5}$ (/°C.), respectively. The outer diameter of the columnar member 82 and the inner diameter of the tubular molding member 83 were so designed that the gap between the two members was 140 $\mu$m when they were heated to 290° C.

Reference numeral 84 denotes a first sheet film to be wound on the outer circumferential surface of the columnar member 82. A 25-$\mu$m thick polyethersulfone film cut into a sheet with predetermined dimensions was used as the first sheet film 84.

Reference numeral 85 denotes a second sheet film. The second sheet film 85 was formed by coating a 5-$\mu$m thick fluorine resin primer layer 86 containing a polyamide resin as a binder on one surface of a film made from tetrafluoroethylene and a perfluoroalkylvinylether copolymer (to be abbreviated as PFA hereinafter). The total thickness of the second sheet film 85 was 20 $\mu$m. The use of the primer can strengthen the bond between these layers.

As shown in FIG. 49, the first sheet film 84 was wound double on the outer circumferential surface of the columnar member 82 such that two ends 84a and 84b butted against each other. Subsequently, the second sheet film 85 was wound singly on the first sheet film 84 such that two ends 85a and 85b of the film 85 butted against each other. As in FIG. 49, the angle which the butted end faces of the first and second layers formed with the sheet film surface was 90°. After the second sheet film was wound, these films were inserted into the tubular molding member 83. The resultant structure was placed in the heating oven described previously and heated at 290° C. for 30 min.

In this heating step, both the columnar member 82 and the tubular molding member 83 were heated to produce a dimensional expansion difference resulting from the difference in the thermal expansion coefficient between the respective materials. As a consequence, the gap between the two members was narrowed. At the same time, the first and second sheet films were softened by heating and thereby the end portions of each film welded together, resulting in two tubular films.

After the heating step, the columnar member, the films, and the tubular molding member were removed from the heating oven and cooled. After cooling, the films were pulled out from the columnar member and the tubular molding member, and it was found that a two-layered film having a uniform thickness of 70±4 μm all over the film was obtained.

The tubular film thus obtained was used as a fixing film of an image forming apparatus as shown in FIG. 10. Consequently, good images were obtained without causing any toner offset phenomenon.

Fifteenth Embodiment

Figure 50:
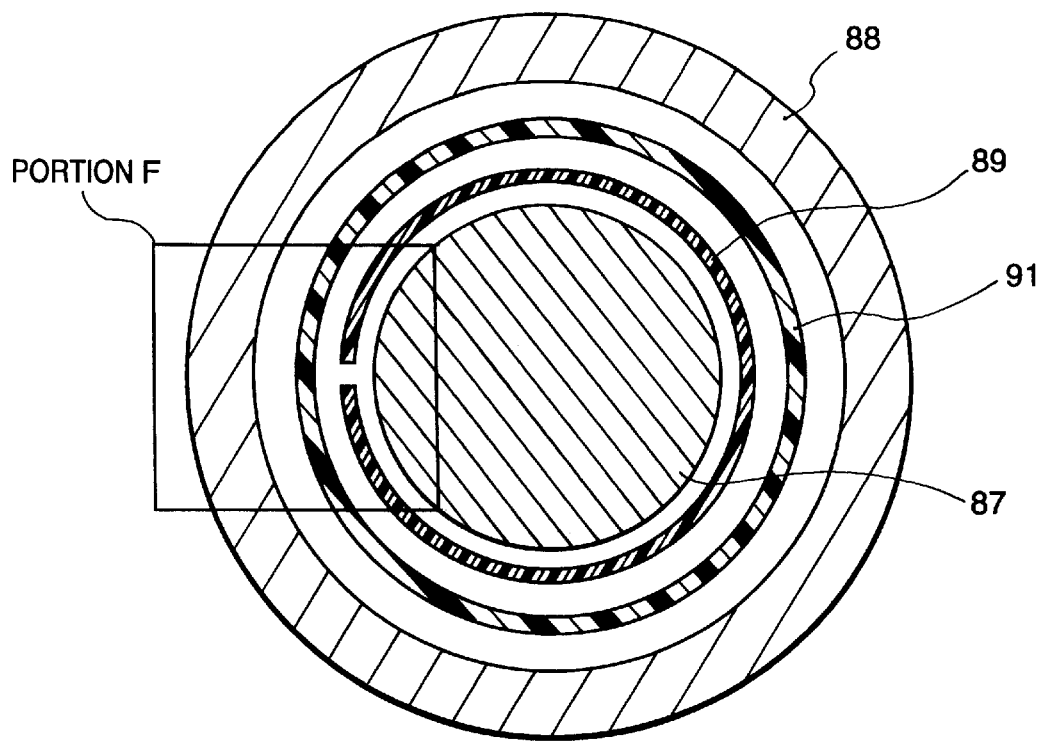
FIG. 50 is a view showing the fifteenth embodiment of the present invention.
Figure 51:
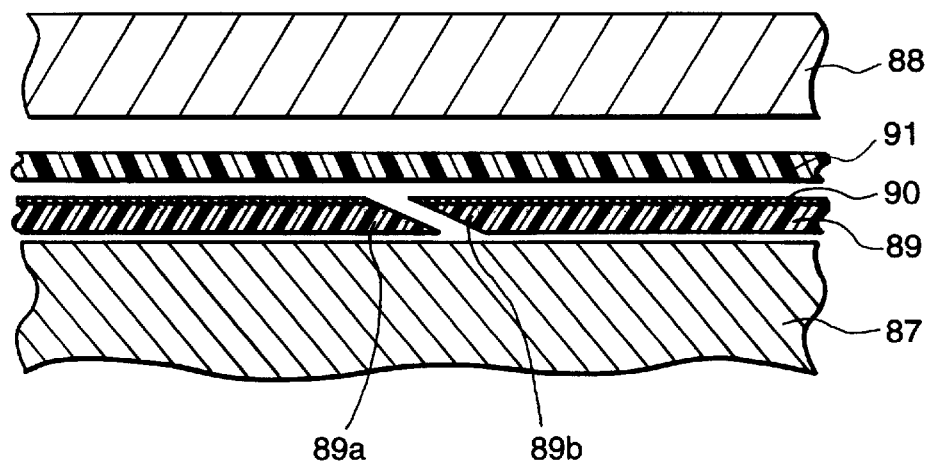
FIG. 51 is a view showing the fifteenth embodiment of the present invention.

FIGS. 50 and 51 illustrate the fifteenth embodiment of the present invention.

This embodiment proposes the second method relating to the method and the apparatus for obtaining a multilayered tubular film. In FIG. 50, reference numeral 87 denotes a columnar member made from a polytetrafluoroethylene resin; and 88, a tubular molding member made from the aluminum material described above. The outer diameter of the columnar member 87 and the inner diameter of the tubular molding member 88 were so designed that the gap between the two members was 140 μm when they were heated to 290° C. Reference numeral 89 denotes a first sheet film to be wound on the outer circumferential surface of the columnar member 87. A 50-μm thick polyethersulfone sheet film cut into predetermined dimensions was used as the first sheet film 89. A 5-μm thick primer layer 90 was coated on one surface of the first sheet film 89 so that the total film thickness was 55 μμm. Reference numeral 91 denotes a 15-μm thick second tubular film made from PFA.

The first sheet film 89 was wound double on the outer circumferential surface of the columnar member 87 such that two ends 89a and 89b butted against each other. Subsequently, the first sheet film 89 was covered with the second sheet film 91.

As in FIG. 51, the angle which the butted end faces of the first layer formed with the sheet film surface was 60°.

After the first sheet film 89 was covered with the second sheet film 91, these films were inserted into the tubular molding member 88. The resultant structure was placed in the heating oven described above and heated at 290° C. for 30 min.

In this heating step, both the columnar member 87 and the tubular molding member 88 were heated to produce a dimensional expansion difference resulting from the difference in the thermal expansion coefficient between the respective materials. As a consequence, the gap between the two members was narrowed. At the same time, the first sheet film was softened by heating and thereby the end portions of the film welded together, resulting in a tubular film. Also, the first and second film layers thermally bonded via the primer layer 90.

After the heating step, the columnar member, the films, and the tubular molding member were removed from the heating oven and cooled. After cooling, the films were pulled out from the columnar member and the tubular molding member, and it was found that a two-layered film having a uniform thickness of 70±4 μm all over the film was obtained.

According to the embodiments of the present invention as described above, a thermoplastic sheet film wound on the outer circumferential surface of a columnar member such that the two ends of the film butted against each other was inserted into a tubular molding member and heated. The gap between the outer diameter of the columnar member and the inner diameter of the tubular molding member was decreased due to the difference between the thermal expansion coefficients of the two members. Also, softening of the film welded and connected the two butted end portions of the film. As a result, the sheet film was formed into a tubular film. Furthermore, heat softening of the film encouraged the uniformization of the film thickness of the entire film. Accordingly, it was possible to obtain fixing films for image forming apparatuses and films suitable for some other applications.

Additionally, according to these embodiments it was possible to obtain tubular films having arbitrary thicknesses by winding the sheet film on the columnar member a plurality of number of times.

Also, in these embodiments the thickness of the finished film can be adjusted by using a combination of thermoplastic resin and non-thermoplastic resin sheet films.

Furthermore, in these embodiments it was possible to obtain a tubular film consisting of a plurality of different types of layers by using a combination of tubular and sheet films.

In the embodiments of the present invention, as a method of manufacturing these tubular films it was possible to obtain a method of manufacturing a fixing film suitable for an image forming apparatus by using the columnar member 1, 8, 16, 22, 26, 34, or 42, the tubular molding member 2, 10, 20, 24, 34, 42, or 52, and the heating oven for the heating step. In this method a fixing film having a high film thickness uniformity and a high connection strength in the connected portion of a tubular film could be manufactured at a low manufacturing cost.

Also, according to these embodiments it was possible to propose a method capable of smoothly releasing a molded tubular film by proposing the method in which a releasing agent was coated on the columnar member or the tubular molding member.

In the manufacturing method of these embodiments, films having any arbitrary shapes, e.g., tubular, annular, and ring-like films can be obtained by selecting the outer diameters, the inner diameters, and the lengths of the columnar member and the tubular molding member.

In these embodiments, a fixing device with good fixing performance could be obtained by the use of the film having a high film thickness uniformity as a fixing film of an image forming apparatus.

Also, in these embodiments the mold shrinkage factor of the resin material was controlled to 0.6 to 2.0%. Accordingly, during molding of an annular film by heat softening, adhesion of the film material to the inner wall surface of the tubular molding member was prevented. This assured the ease of release and the uniformity of the film thickness throughout the circumference of the tubular film.

Additionally, a thermoplastic sheet film wound on the outer circumferential surface of the columnar member so that the two ends of the film butted against each other was inserted into the tubular molding member and heated. The gap between the outer diameter of the columnar member and the inner diameter of the tubular molding member was decreased due to the difference between the thermal expansion coefficients of the two members. Also, softening of the film welded and connected the two butted end portions of the film. As a result, the sheet film was formed into a tubular film. Furthermore, heat softening of the film encouraged the uniformization of the film thickness of the entire film.

Accordingly, it was possible to obtain fixing films for image forming apparatuses and films suitable for some other applications.

According to the embodiments of the present invention, a fixing device with good fixing performance could be obtained by the use of the film having a very high film thickness uniformity (±6% or less) as a fixing film of an image forming apparatus.

Furthermore, it was possible to enhance the strength of the connected portion by changing the angle which the butted end face formed with the film surface.

Moreover, the tubular film manufactured by any of the above embodiments has a function as a conveyor belt member.

The present invention is not limited to the above embodiments and various changes and modifications can be made within the spirit and scope of the present invention. Therefore, to apprise the public of the scope of the present invention the following claims are made.

What is claimed is:

1. A method of manufacturing a tubular film used in an image forming apparatus, comprising the steps of:

winding a thermoplastic sheet film on a columnar member;

overlapping leading and trailing end portions of said film;

fitting a tubular molding member on said wound film; and connecting the overlapped portions of said film by heating at least said film, thereby forming said sheet into a tubular film, wherein a thermal expansion coefficient of said columnar member is larger than a thermal expansion coefficient of said tubular molding member.

2. The method according to claim 1, wherein when said film is in a molten state in the heated state, a tubular film with an arbitrary thickness is obtained in accordance with a gap between said columnar member and said tubular molding member.

3. The method according to claim 1, wherein said sheet film is formed into a tubular film by winding said sheet film on said columnar member a plurality of times.

4. The film according to claim 3, wherein when said sheet film is wound on said columnar member a plurality of times, the leading and trailing end portions of said film are overlapped to form a wound body.

5. The method according to claim 1, wherein the overlapped end portions formed when the end portions of said film are overlapped coil on a surface of said tubular film.

6. The method according to claim 1, wherein when the two end portions of said film are obliquely cut and overlapped to form a tubular film, the overlapped end portions are spirally formed.

7. The method according to claim 1, wherein when said film is wound once, the overlapped end portions contact each other along an entire length of said end portions.

8. The method according to claim 1, wherein an angle which the overlapped end portions form with a film surface is 90°.

9. The method according to claim 1, wherein an angle which the overlapped end forces form with a film surface is other than 90°.

10. The method according to claim 1, wherein said sheet film is made from at least one material selected from the group consisting of thermoplastic polyimide, polyetheretherketone, polyethersulfone, and a fluorine resin.

11. A method of manufacturing a tubular film, comprising the steps of:

winding a thermoplastic sheet film on a columnar member, overlapping leading and trailing end portions of said film on each other, and fitting a tubular molding member on said wound film;

connecting the overlapping portions of said film by heating at least said film, thereby forming said sheet film into a tubular film, wherein a difference between an inner diameter of said tubular molding member and an outer diameter of said columnar member is twice as large as a desired thickness of a tubular film at a temperature necessary for heating-welding of said sheet film, and wherein said film and said columnar member fitted in said tubular molding member are cooled to a predetermined temperature after being heated; and peeling said film from said tubular molding member after molding.

12. The method according to claim 11, wherein a thermal expansion coefficient of a material of said columnar member is larger than a thermal expansion coefficient of a material of said tubular molding member.

13. The method according to claim 11, wherein a difference between the thermal expansion coefficients of the materials of said columnar member and said tubular molding member is not less than $1 \times 10^{-7}$ (/°C.).

14. A method of manufacturing a tubular film used in an image forming apparatus, comprising the steps of:

winding a thermoplastic sheet film 5 to 300 $\mu$m in thickness on a columnar member so that leading and trailing end portions of said film partially overlap each other;

covering said wound film with a tubular molding member whose inner diameter is larger by not less than 15 $\mu$m than outer diameter of said columnar member; and connecting the overlapping portions of said film by holding at least said film within a temperature range from a melt temperature to a decomposition thereof temperature for a predetermined time.

15. The method according to claim 14, wherein said columnar member is a hollow member.

16. A method of manufacturing tubular film, comprising the steps of:

winding a first thermoplastic sheet film a plurality of number of times on a columnar member so that leading and trailing end portions partially overlap each other;

winding a second thermoplastic sheet film a plurality of number of times on said wound first sheet film so that leading and trailing end portions partially overlap each other;

covering said first and second films with a tubular molding member;

connecting the overlapping portions by heating said first and second films to a temperature, at which the overlapping portions are connected, for a predetermined time, thereby forming a multilayered tubular films;

cooling said columnar member, said films, and said tubular molding member after the heating step; and peeling said film from said tubular molding member after molding.

17. A method of manufacturing a tubular film, comprising the steps of:

winding a thermoplastic sheet film on a columnar member so that leading and trailing ends of said film partially overlap each other;

fitting a thermoplastic tube on said sheet film;

fitting a tubular molding member on said thermoplastic tube; and connecting the overlapping portions by heating at least said sheet film within a temperature range from a melt temperature to a decomposition temperature thereof.

18. The method according to claim 17, further comprising the step of cooling said columnar member, said film, and said tubular molding member after the heating step.

19. A method of manufacturing a tubular film, comprising the steps of:

fitting a non-thermoplastic tube on a columnar member;

winding a thermoplastic sheet film on said tube so that leading and trailing end portions of said film partially overlap each other;

fitting a tubular molding member on said sheet film; and connecting the overlapping portions by heating at least said sheet film within a temperature range from a melt temperature to a decomposition temperature thereof.

20. The method according to claim 19, further comprising the step of cooling said columnar member, said film, and said tubular molding member after the heating step.

21. A method of manufacturing a tubular film, comprising the steps of:

fitting a non-thermoplastic first tube on a columnar member;

fitting a thermoplastic second tube on said first tube;

fitting a tubular molding member on said second tube;

connecting overlapping portions of said first tube and said second tube by heating at least said second tube within a temperature range from a melt temperature to a decomposition temperature thereof; and cooling said columnar member, said film, and said tubular molding member after the heating step.

* * * * *

UNITED STATES PATENT AND TRADEMARK OFFICE
CERTIFICATE OF CORRECTION

PATENT NO.    :    5,944,930

DATED          :    August 31, 1999

INVENTOR(S) :    Kazutaka TAKEUCHI, et al.                    Page 1 of 2

It is certified that error appears in the above-identified patent and that said Letters Patent is hereby corrected as shown below:

IN THE DRAWINGS:

Sheet 6, Figure 10, "TUBLAR" should read --TUBULAR--.

COLUMN 14:

Line 6, "but a film is not used" should read --is not used but a film--.

COLUMN 22:

Line 44, "5-μn" should read --5 μm--.

UNITED STATES PATENT AND TRADEMARK OFFICE
CERTIFICATE OF CORRECTION

PATENT NO. : 5,944,930

DATED : August 31, 1999

INVENTOR(S) : Kazutaka TAKEUCHI, et al.

It is certified that error appears in the above-identified patent and that said Letters Patent is hereby corrected as shown below:

COLUMN 23:

Line 34, "55 µµm" should read --55 µm--.

COLUMN 25:

Line 41,"film" should read --method--.
Line 59, "forces" should read --portions--.

Signed and Sealed this

Twenty-fourth Day of October, 2000

Attest:

Q. TODD DICKINSON

Attesting Officer

Director of Patents and Trademarks